United States Patent
Nakagawa et al.

(10) Patent No.: US 11,810,601 B2
(45) Date of Patent: Nov. 7, 2023

(54) MAGNETIC HEAD INCLUDING MULTIPLE MAGNETIC LAYERS AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Masayuki Takagishi, Kunitachi (JP); Naoyuki Narita, Funabashi (JP); Tazumi Nagasawa, Yokohama (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 9 days.

(21) Appl. No.: 17/575,824

(22) Filed: Jan. 14, 2022

(65) Prior Publication Data
US 2023/0031273 A1 Feb. 2, 2023

(30) Foreign Application Priority Data
Jul. 30, 2021 (JP) .................................. 2021-125149

(51) Int. Cl.
*G11B 5/235* (2006.01)
*G11B 5/127* (2006.01)
(Continued)

(52) U.S. Cl.
CPC ............ *G11B 5/235* (2013.01); *G11B 5/1278* (2013.01); *G11B 5/31* (2013.01); *G11B 5/314* (2013.01);
(Continued)

(58) Field of Classification Search
None
See application file for complete search history.

(56) References Cited

U.S. PATENT DOCUMENTS 7,616,412 B2 11/2009 Zhu et al.
2008/0268291 A1 10/2008 Akiyama et al.
(Continued)

FOREIGN PATENT DOCUMENTS

JP 2008-277586 A 11/2008

OTHER PUBLICATIONS

Vouille, C. et al. "Microscopic mechanisms of giant magnetoresistance" Physical Review B, vol. 60 No. 9, Sep. 1, 1999. 13 pages.

*Primary Examiner* — Craig A. Renner
(74) *Attorney, Agent, or Firm* — Oblon, McClelland, Maier & Neustadt, L.L.P.

(57) ABSTRACT

According to one embodiment, a magnetic head includes a first magnetic pole, a second magnetic pole, and a stacked body provided between the first and second magnetic poles. The stacked body includes a first magnetic layer, a second magnetic layer provided between the first magnetic layer and the second magnetic pole, a third magnetic layer provided between the second magnetic layer and the second magnetic pole, a first non-magnetic layer provided between the first and second magnetic layers, a second non-magnetic layer provided between the second and third magnetic layers, a third non-magnetic layer provided between the first magnetic pole and the first magnetic layer, and a fourth non-magnetic layer provided between the third magnetic layer and the second magnetic pole. A first magnetic pole length is shorter than a second magnetic pole length. A first magnetic layer length is longer than a second magnetic layer length.

18 Claims, 17 Drawing Sheets

(51) Int. Cl.
*G11B 5/31* (2006.01)
*G11B 5/245* (2006.01)
*G11B 5/00* (2006.01)

(52) U.S. Cl.
CPC .......... *G11B 5/3146* (2013.01); *G11B 5/2455* (2013.01); *G11B 2005/0024* (2013.01)

(56) References Cited

U.S. PATENT DOCUMENTS

| | | | | |
|---|---|---|---|---|
| 2009/0316303 | A1* | 12/2009 | Yamada et al. ...... | G11B 5/3146 360/234.3 |
| 2012/0126905 | A1* | 5/2012 | Zhang et al. ........ | G11B 5/3146 427/130 |
| 2022/0005497 | A1* | 1/2022 | Takagishi et al. ... | G11B 5/3146 |

* cited by examiner

MAGNETIC HEAD INCLUDING MULTIPLE MAGNETIC LAYERS AND MAGNETIC RECORDING DEVICE

CROSS-REFERENCE TO RELATED APPLICATIONS

This application is based upon and claims the benefit of priority from Japanese Patent Application No. 2021-125149, filed on Jul. 30, 2021; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic layer and the second magnetic pole, a third magnetic layer provided between the second magnetic layer and the second magnetic pole, a first non-magnetic layer provided between the first magnetic layer and the second magnetic layer, a second non-magnetic layer provided between the second magnetic layer and the third magnetic layer, a third non-magnetic layer provided between the first magnetic pole and the first magnetic layer, and a fourth non-magnetic layer provided between the third magnetic layer and the second magnetic pole. The fourth non-magnetic layer includes at least one selected from the group consisting of Cu, Au, Al, V and Ag. The third magnetic layer includes $(Fe_{100-x}Co_x)_{100-y}E_y$ (10 atomic %≤x≤50 atomic %, 10 atomic %≤y≤90 atomic %). A second element E includes at least one selected from the group consisting of Cr, V, Mn, Ti and Sc. A first magnetic pole length of the first magnetic pole along a second direction is shorter than a second magnetic pole length of the second magnetic pole along the second direction. The second direction is perpendicular to a first direction from the first magnetic layer to the second magnetic layer, and is along a medium-facing surface of the first magnetic pole. A first magnetic layer length of the first magnetic layer along a third direction is longer than a second magnetic layer length of the second magnetic layer along the third direction. The third direction is perpendicular to the first direction.

According to one embodiment, a magnetic recording device includes the magnetic head described above, and an electric circuit. The electric circuit is configured to supply a current to the stacked body. The current has an orientation from the first magnetic layer to the second magnetic layer.

First Embodiment

Figure 1A:
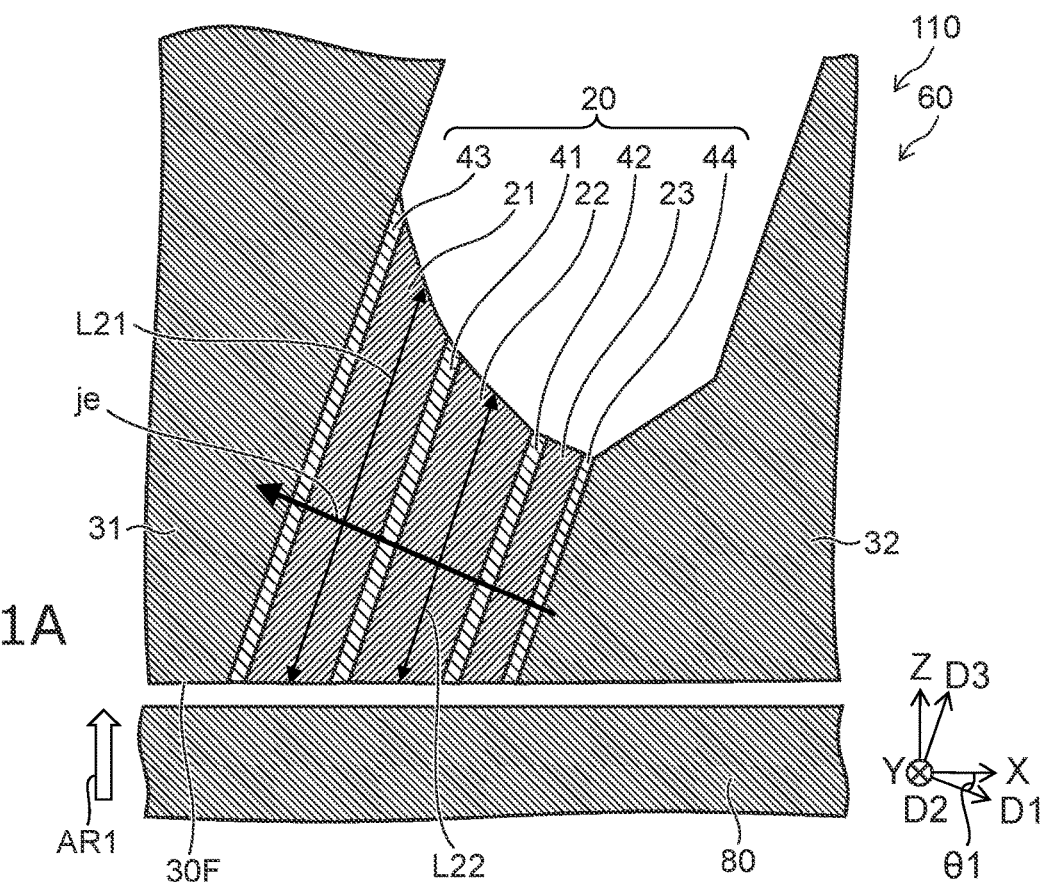
FIGS. 1A and 1B are schematic views illustrating a magnetic head according to a first embodiment.
Figure 1B:
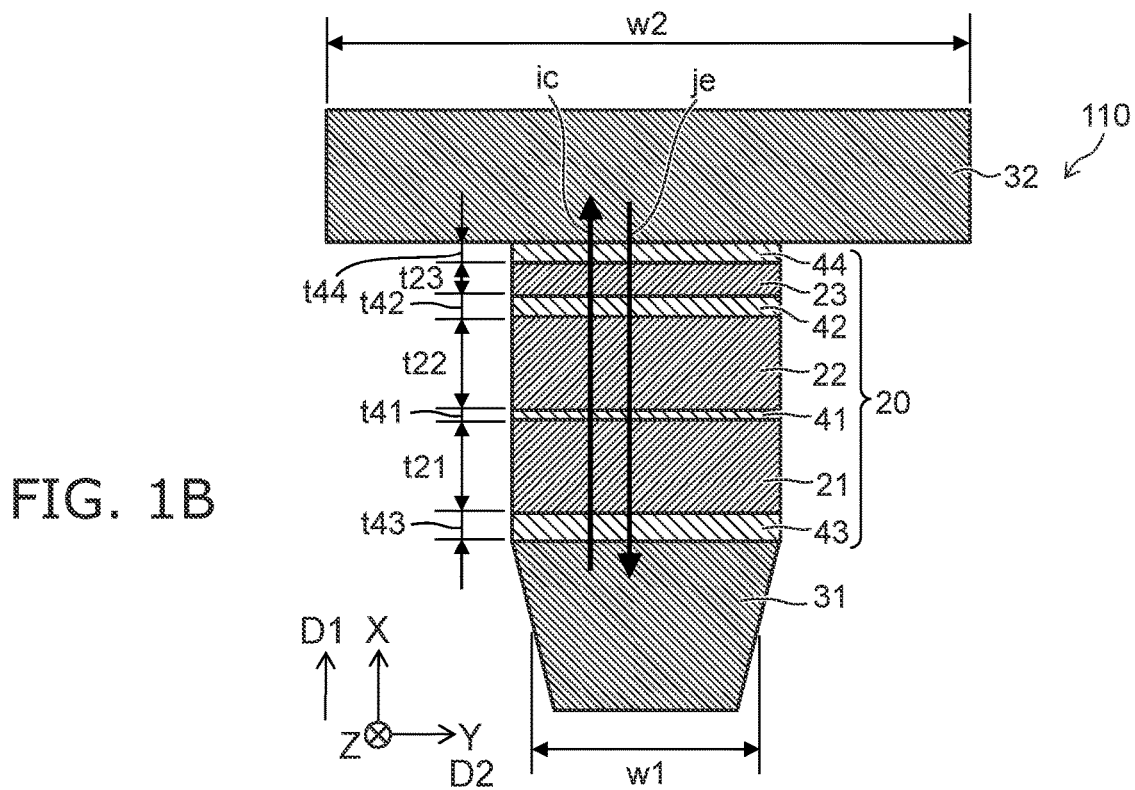

FIGS. 1A and 1B are schematic views illustrating a magnetic head according to a first embodiment.

FIG. 1A is a cross-sectional view. FIG. 1B is a plan view seen from the arrow AR1 of FIG. 1A.

Figure 2:
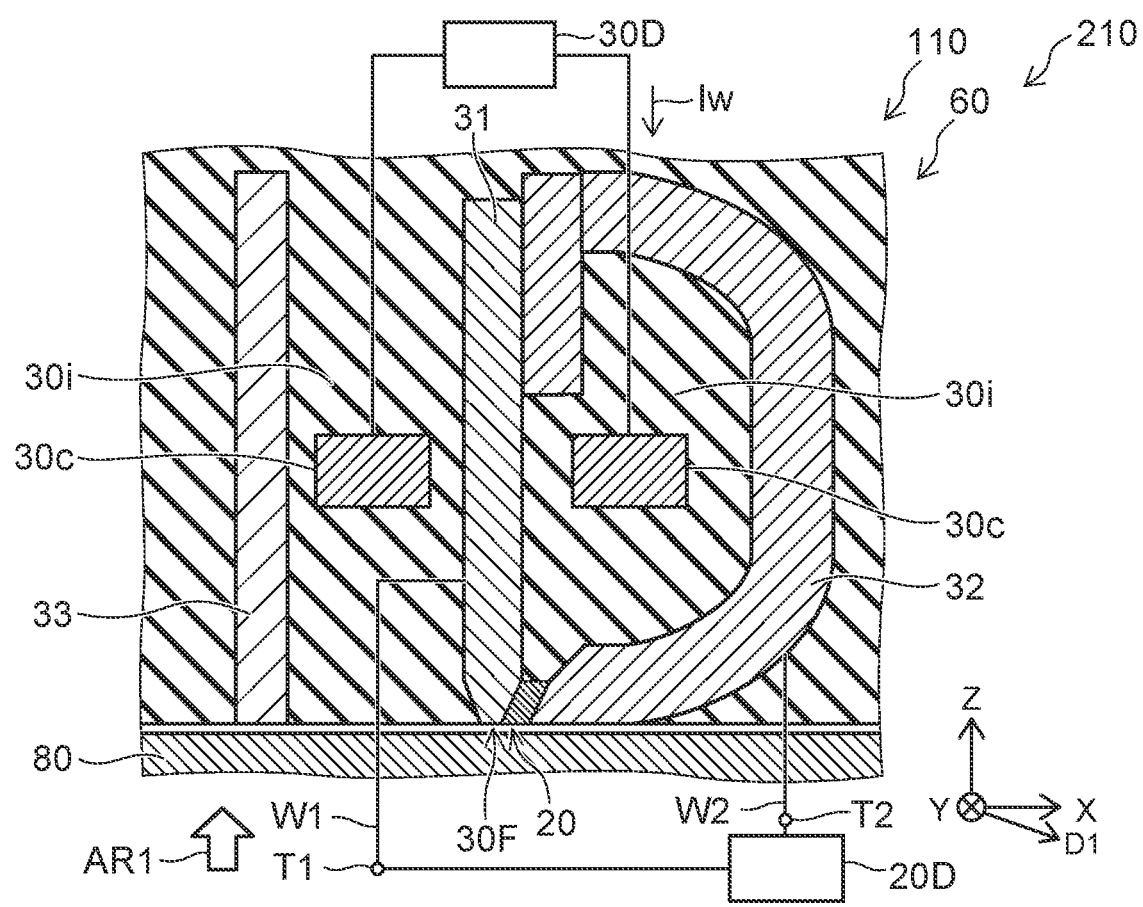
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, a magnetic recording device 210 according to the embodiment includes a magnetic head 110 and an electric circuit 20D. The magnetic recording device 210 may include a magnetic recording medium 80. At least the recording operation is performed in the magnetic recording device 210. In the recording operation, information is recorded on the magnetic recording medium 80 by using the magnetic head 110.

The magnetic head 110 includes a recording part 60. As described later, the magnetic head 110 may include a reproducing part. The recording part 60 includes a first magnetic pole 31, a second magnetic pole 32, and a stacked body 20.

The stacked body 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A magnetic field (recording magnetic field) generated from the magnetic head 110 is applied to a desired position of the magnetic recording medium 80. The magnetization of the magnetic recording medium 80 at the desired position is controlled in a direction corresponding to the recording magnetic field. As a result, information is recorded on the magnetic recording medium 80.

A direction from the first magnetic pole 31 to the second magnetic pole 32 is defined as a first direction D1. The first direction D1 is substantially along the X-axis direction. In the embodiment, the first direction D1 may be inclined at a small angle with respect to the X-axis direction.

As shown in FIG. 2, a coil 30c is provided. In this example, a part of the coil 30c is between the first magnetic pole 31 and the second magnetic pole 32. In this example, a shield 33 is provided. In the X-axis direction, there is the first magnetic pole 31 between the shield 33 and the second magnetic pole 32. Another part of the coil 30c is between the shield 33 and the first magnetic pole 31. An insulating member 30i is provided between these multiple elements. The shield 33 is, for example, a leading shield. The magnetic head 110 may include a side shield (not shown).

As shown in FIG. 2, a recording current Iw is supplied to the coil 30c from a recording circuit 30D. The recording magnetic field corresponding to the recording current Iw is applied to the magnetic recording medium 80 from the first magnetic pole 31.

As shown in FIG. 2, the first magnetic pole 31 includes a medium-facing surface 30F. The medium-facing surface 30F is, for example, ABS (Air Bearing Surface). The medium-facing surface 30F faces, for example, the magnetic recording medium 80. The medium-facing surface 30F is, for example, along the X-Y plane.

As shown in FIG. 2, the electric circuit 20D is electrically connected to the stacked body 20. In this example, the stacked body 20 is electrically connected to the first magnetic pole 31 and the second magnetic pole 32. The magnetic head 110 is provided with a first terminal T1 and a second terminal T2. The first terminal T1 is electrically connected to the stacked body 20 via a first wiring W1 and the first magnetic pole 31. The second terminal T2 is electrically connected to the stacked body 20 via a second wiring W2 and the second magnetic pole 32. From the electric circuit 20D, for example, a current (for example, a direct current) is supplied to the stacked body 20.

As shown in FIGS. 1A and 1B, the stacked body 20 includes a first magnetic layer 21, a second magnetic layer 22, a third magnetic layer 23, a first non-magnetic layer 41, a second non-magnetic layer 42, a third non-magnetic layer 43 and a fourth non-magnetic layer 44. In FIGS. 1A and 1B, the insulating part 30i is omitted.

The second magnetic layer 22 is provided between the first magnetic layer 21 and the second magnetic pole 32. The third magnetic layer 23 is provided between the second magnetic layer 22 and the second magnetic pole 32. The first non-magnetic layer 41 is provided between the first magnetic layer 21 and the second magnetic layer 22. The second non-magnetic layer 42 is provided between the second magnetic layer 22 and the third magnetic layer 23. The third non-magnetic layer 43 is provided between the first magnetic pole 31 and the first magnetic layer 21. The fourth non-magnetic layer 44 is provided between the third magnetic layer 23 and the second magnetic pole 32.

The first non-magnetic layer 41 may be in contact with, for example, the first magnetic layer 21 and the second magnetic layer 22. The second non-magnetic layer 42 may be in contact with, for example, the second magnetic layer 22 and the third magnetic layer 23. The third non-magnetic layer 43 may be in contact with, for example, the first magnetic pole 31 and the first magnetic layer 21. The fourth non-magnetic layer 44 may be in contact with, for example, the third magnetic layer 23 and the second magnetic pole 32.

As shown in FIG. 1A, in this example, the first direction D1 from the first magnetic layer 21 to the second magnetic layer 22 is inclined with respect to the medium-facing surface 30F of the first magnetic pole 31. The first direction D1 corresponds to a stacking direction of the stacked body 20.

A direction perpendicular to the first direction D1 and along the medium-facing surface 30F of the first magnetic pole 31 is defined as a second direction D2. The second direction D2 is, for example, the Y-axis direction (cross-track direction).

As shown in FIG. 1B, a length of the first magnetic pole 31 along the second direction D2 is defined as a first magnetic pole length w1. A length of the second magnetic pole 32 along the second direction D2 is defined as a second magnetic pole length w2. These lengths may be widths. The first magnetic pole length w1 is shorter than the second magnetic pole length w2.

The first magnetic pole length w1 may be practically a length along the second direction D2 (Y-axis direction) of the first magnetic pole 31 at the center position of the first magnetic pole 31 in the X-axis direction. The second magnetic pole length w2 may be practically a length along the second direction D2 (Y-axis direction) of the second magnetic pole 32 at the center position of the second magnetic pole 32 in the X-axis direction.

Since the first magnetic pole length w1 is shorter than the second magnetic pole length w2, the magnetic field from the first magnetic pole 31 can easily enter the second magnetic pole 32, and the second magnetic pole 32 can easily function as a trailing shield.

As shown in FIG. 1A, one direction perpendicular to the first direction D1 is defined as a third direction D3. In this example, the third direction D3 crosses the second direction D2. The third direction D3 is, for example, perpendicular to the second direction D2. In this example, since the first direction D1 is inclined with respect to the medium-facing surface 30F, the third direction D3 is inclined with respect to the medium-facing surface 30F.

A length of the first magnetic layer 21 along the third direction D3 is defined as a first magnetic layer length L21. A length of the second magnetic layer 22 along the third direction D3 is defined as a second magnetic layer length L22. The first magnetic layer length L21 is longer than the second magnetic layer length L22. As described later, due to such a length relationship, stable oscillation can be easily obtained in the stacked body 20.

As shown in FIG. 1B, a current ic is supplied to such a stacked body 20. The current ic is supplied from, for example, the electric circuit 20D described above. As shown in FIG. 1B, the current ic has an orientation from the first magnetic layer 21 to the second magnetic layer 22. As shown in FIGS. 1A and 1B, an electron flow je accompanying the current ic has an orientation from the second magnetic layer 22 to the first magnetic layer 21.

For example, when the current ic not less than the threshold value flows through the stacked body 20, the magnetization of the stacked body 20 oscillates. The stacked body 20 functions as, for example, an STO (Spin-Torque Oscillator). An alternating magnetic field (for example, high frequency magnetic field) is generated from the stacked body 20 with the oscillation. The alternating magnetic field generated by the stacked body 20 is applied to the magnetic recording medium 80, and writing to the magnetic recording medium 80 is assisted. For example, MAMR (Microwave Assisted Magnetic Recording) can be performed.

In the magnetic head 110, the first magnetic layer 21 and the second magnetic layer 22 function as, for example, an oscillation layer. The third magnetic layer 23 functions as a spin injection layer. The magnetization of the third magnetic layer 23 is not fixed in a specific direction. During operation, the orientation of magnetization of the third magnetic layer 23 can be changed.

For example, the spin torque reflected by the first magnetic pole 31 acts on the first magnetic layer 21. For example, the spin torque transmitted from the third magnetic layer 23 is injected into the second magnetic layer 22. It is considered that the first magnetic layer 21 and the second magnetic layer 22 are magnetized in opposite orientations to each other, and these magnetizations are stable and easily oscillate.

In the magnetic head 110, the fourth non-magnetic layer 44 includes, for example, at least one selected from the group consisting of Cu, Au, Cr, Al, V and Ag. The third magnetic layer 23 includes, for example, $(Fe_{100-x}Co_x)_{100-y}E_y$ (10 atomic %≤x≤50 atomic %, 10 atomic %≤y≤90 atomic %), and the second element E includes at least one selected from the group consisting of Cr, V, Mn, Ti and Sc.

The first magnetic layer 21 and the second magnetic layer 22 do not include the above-mentioned second element. Alternatively, a concentration of the second element in the first magnetic layer 21 and the second magnetic layer 22 is lower than a concentration of the second element in the third magnetic layer 23. The first magnetic layer 21 includes at least one of Fe, Co or Ni. The second magnetic layer 22 includes at least one of Fe, Co or Ni.

For example, the first magnetic layer 21 and the second magnetic layer 22 have positive spin polarization. The third magnetic layer 23 has negative spin polarization. In such a stacked body 20, high-efficiency oscillation can be obtained.

For example, the spin torque transmitted from the second magnetic pole 32 is injected into the third magnetic layer 23. It is considered that the third magnetic layer 23 is magnetized parallel to the magnetization of the second magnetic pole 32, and the spin torque transmitted from the third magnetic layer 23 to the second magnetic layer 22 is stable. It is considered that the magnetization of the first magnetic layer 21 and the second magnetic layer 22 is likely to oscillate.

Figure 3A:
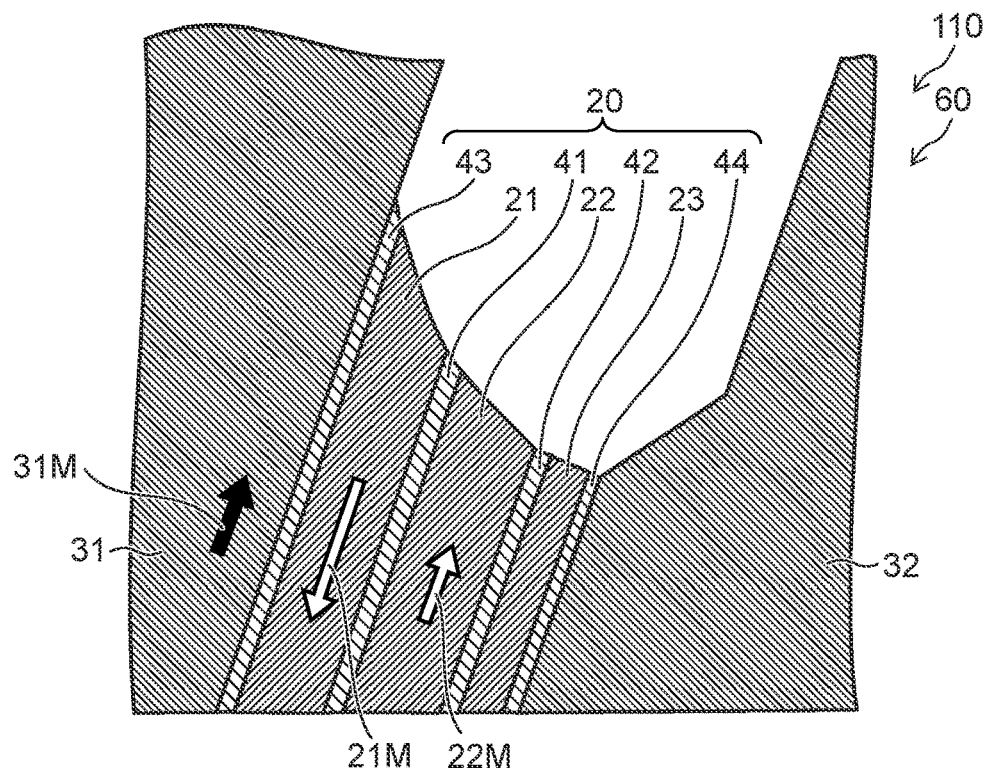
FIGS. 3A and 3B are schematic views illustrating the magnetic heads according to the first embodiment.
Figure 3B:
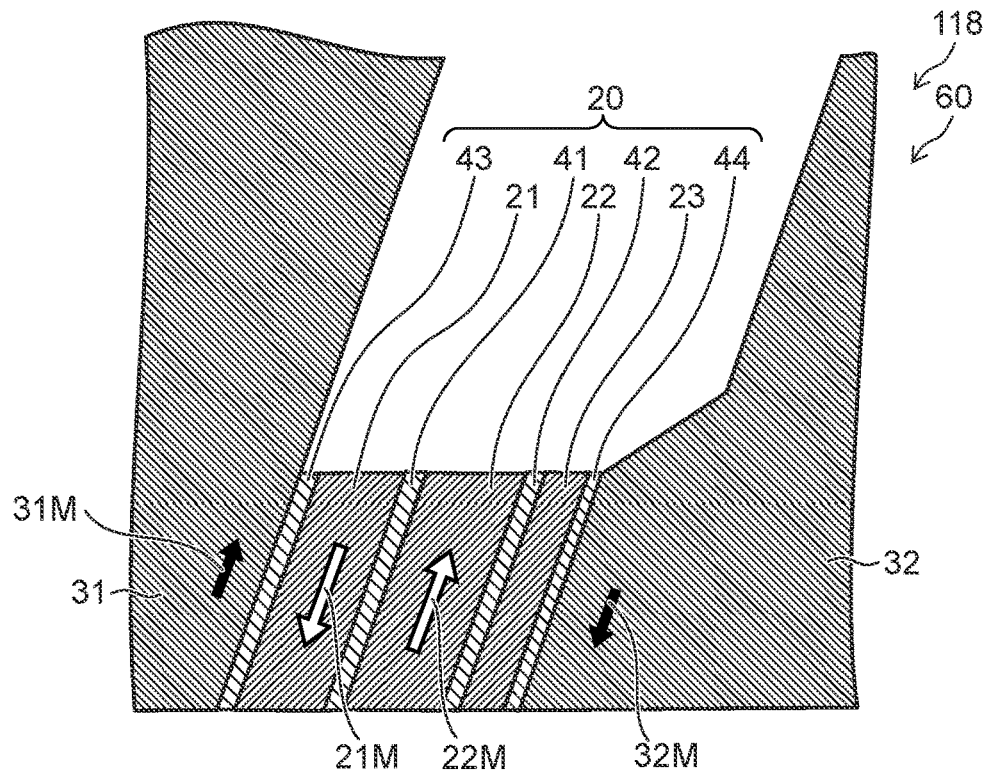

FIGS. 3A and 3B are schematic cross-sectional views illustrating the magnetic heads according to the first embodiment.

FIG. 3A corresponds to the magnetic head 110 according to the embodiment. In the magnetic head 110, the size of the first magnetic layer 21 (first magnetic layer length L21, see FIG. 1A) is greater than the size of the second magnetic layer 22 (second magnetic layer length L22, FIG. 1A). FIG. 3B corresponds to a magnetic head 118 of the reference example. In the magnetic head 118, the size of the first magnetic layer 21 is the same as the size of the second magnetic layer 22. For example, as shown in FIGS. 3A and 3B, the magnetization 21M of the first magnetic layer 21 and the magnetization 22M of the second magnetic layer 22 are antiparallel.

As shown in FIG. 3B, a magnetic field 31M due to the influence of the first magnetic layer 21 is generated on the first magnetic pole 31. A magnetic field 32M due to the influence of the second magnetic layer 22 is generated on the second magnetic pole 32. In the magnetic head 118 of the reference example, since the size of the first magnetic layer 21 is the same as the size of the second magnetic layer 22, the magnetic field 31M is substantially the same as the magnetic field 32M.

On the other hand, as shown in FIG. 3A, in the case of the magnetic head 110 in which the size of the first magnetic layer 21 is greater than the size of the second magnetic layer 22, the magnetic field 31M due to the influence of the first magnetic layer 21 is increased, and the magnetic field 32M due to the influence of the second magnetic layer 22 is small, or substantially does not occur.

As described above, in the magnetic head 110 according to the embodiment, the magnetic field 31M at the first magnetic pole 31 can be increased by making the first magnetic layer length L21 longer than the second magnetic layer length L22. Then, the magnetic field 32M at the second magnetic pole 32 can be suppressed. As a result, the interaction between the first magnetic pole 31 and the laminated body 20 can be increased. Noise generated at the second magnetic pole 32 can be suppressed.

In the embodiment, it is easy to obtain stable oscillation in the stacked body 20. As a result, stable MAMR can be performed. According to the embodiment, it is possible to provide a magnetic head capable of improving the recording density.

In the embodiment, the first non-magnetic layer 41 includes, for example, at least one first element selected from the group consisting of Ru, Ir, Ta and W. A thickness of the first non-magnetic layer 41 along the first direction D1 is defined as a first non-magnetic layer thickness t41 (see FIG. 1B). In the embodiment, the first non-magnetic layer thickness t41 is, for example, not less than 0.2 nm and not more than 3 nm. With such a configuration, the first magnetic layer 21 and the second magnetic layer 22 are likely to be antiferromagnetically bonded.

By antiferromagnetic bonding of the first magnetic layer 21 and the second magnetic layer 22, for example, the vertical component (component along the Z-axis direction) of the alternating magnetic field generated from the stacked body 20 is suppressed. On the other hand, the in-plane component of the alternating magnetic field (component along the X-Y plane) strengthens. In the embodiment, for example, the SNR is improved by suppressing the vertical component (component along the Z-axis direction) of the alternating magnetic field generated from the stacked body 20.

In the embodiment, a magnetic thickness of the first magnetic layer 21 may be substantially the same as a magnetic thickness of the second magnetic layer 22. For example, a first product of the thickness of the first magnetic layer 21 along the first direction D1 (first magnetic layer thickness t21) and saturation magnetization of the first magnetic layer 21 may be substantially the same as a second product of the thickness of the second magnetic layer 22 along the first direction D1 (second magnetic layer thickness t22) and saturation magnetization of the second magnetic layer 22. For example, the first product may be not less than 0.8 times and not more than 1.25 times the second product.

For example, the second magnetic layer thickness t22 may be not less than 0.8 times and not more than 1.25 times the first magnetic layer thickness t21.

In the embodiment, the first magnetic layer thickness t21 is, for example, not less than 5 nm and not more than 15 nm. In one example, the first magnetic layer thickness t21 is, for example, not less than 8 nm and not more than 10 nm. The second magnetic layer thickness t22 is, for example, not more than 5 nm and not less than 15 nm. In one example, the second magnetic layer thickness t22 is, for example, not less than 8 nm and not more than 10 nm.

A thickness of the third magnetic layer 23 along the first direction D1 is defined as a third magnetic layer thickness t23 (see FIG. 1B). The third magnetic layer thickness t23 is, for example, thinner than the first magnetic layer thickness t21 and thinner than the second magnetic layer thickness t22. The third magnetic layer thickness t23 is, for example, not more than 0.7 times the first magnetic layer thickness t21 and not more than 0.7 times the second magnetic layer thickness t22. The third magnetic layer thickness t23 is, for example, not less than 0.5 nm and not more than 6 nm. The third magnetic layer thickness t23 may be, for example, not less than 1 nm or more and not more than 5 nm.

A thickness of the second non-magnetic layer 42 along the first direction D1 is defined as a second non-magnetic layer thickness t42 (see FIG. 1B). The second non-magnetic layer thickness t42 is, for example, not less than 1 nm and not more than 5 nm. A thickness of the third non-magnetic layer 43 along the first direction D1 is defined as a third non-magnetic layer thickness t43 (see FIG. 1B). The third non-magnetic layer thickness t43 is, for example, not less than 1 nm and not more than 5 nm. A thickness of the fourth non-magnetic layer along the first direction D1 is defined as a fourth non-magnetic layer thickness t44 (see FIG. 1B). The fourth non-magnetic layer thickness t44 is, for example, not less than 1 nm and not more than 5 nm. Such thicknesses facilitate, for example, spin conduction between layers. For example, stable oscillation can be easily obtained.

In the embodiment, the second non-magnetic layer 42 and the third non-magnetic layer 43 include, for example, at least one selected from the group consisting of Cu, Au, Cr, Al, V and Ag. In the second non-magnetic layer 42 and the third non-magnetic layer 43, for example, high spin transmittance can be obtained. For example, stable oscillation can be easily obtained.

In the magnetic head 110, an angle θ1 (see FIG. 1A) between the first direction D1 and the medium-facing surface 30F may be, for example, not less than 10 degrees and not more than 30 degrees.

Figure 4A:
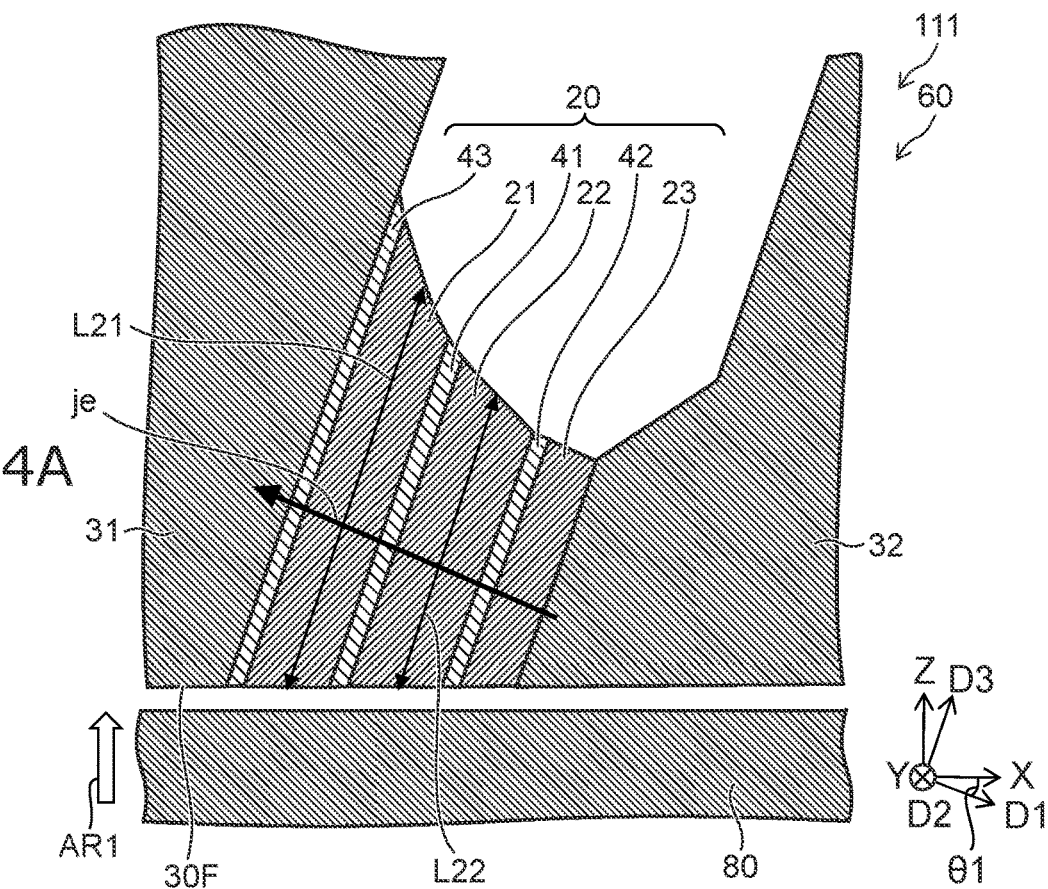
FIGS. 4A and 4B are schematic views illustrating a magnetic head according to the first embodiment.
Figure 4B:
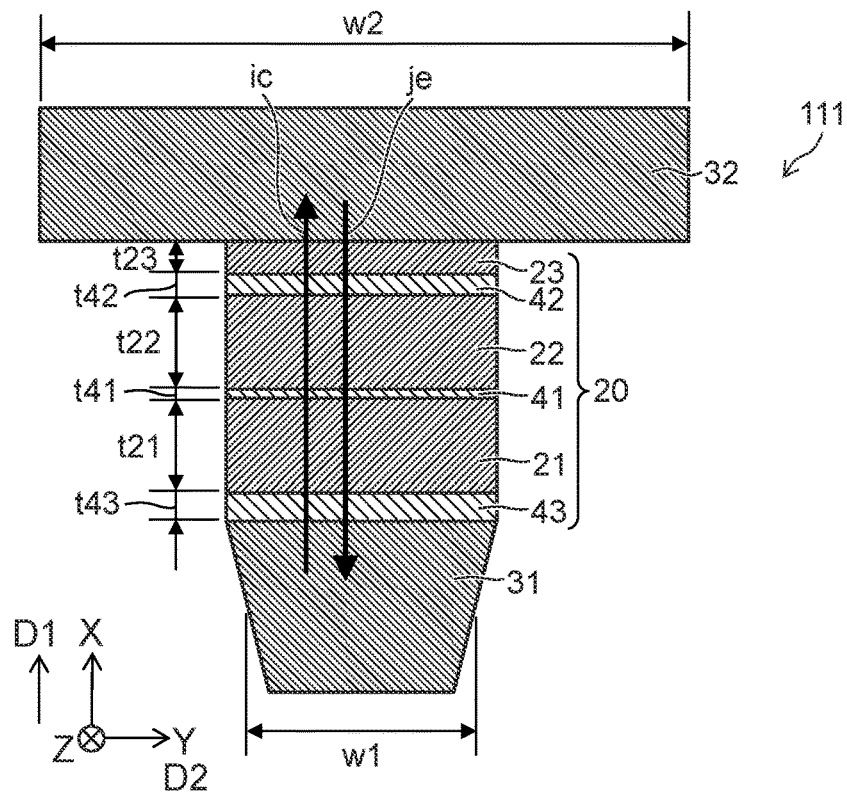

FIGS. 4A and 4B are schematic views illustrating a magnetic head according to the first embodiment.

FIG. 4A is a cross-sectional view. FIG. 4B is a plan view seen from the arrow AR1 of FIG. 4A.

As shown in FIG. 4A, the recording part 60 of a magnetic head 111 also includes the first magnetic pole 31, the second magnetic pole 32, and the stacked body 20 provided between the first magnetic pole 31 and the second magnetic pole 32. As shown in FIGS. 4A and 4B, the stacked body 20 includes the first to third magnetic layers 21 to 23 and the first to third non-magnetic layers 41 to 43. The second magnetic layer 22 is provided between the first magnetic layer 21 and the second magnetic pole 32. The third magnetic layer 23 is provided between the second magnetic layer 22 and the second magnetic pole 32. The first non-magnetic layer 41 is provided between the first magnetic layer 21 and the second magnetic layer 22. The second non-magnetic layer 42 is provided between the second magnetic layer 22 and the third magnetic layer 23. The third non-magnetic layer 43 is provided between the first magnetic pole 31 and the first magnetic layer 21. For example, the third magnetic layer 23 may be in contact with the second magnetic pole 32. For example, it is considered that combination of the magnetization of the third magnetic layer 23 and the magnetization of the second magnetic pole 32 stabilizes the spin torque transmitted from the third magnetic layer 23 to the second magnetic layer 22. It is considered that the magnetization of the first magnetic layer 21 and the second magnetic layer 22 is likely to oscillate.

In the magnetic head 111, the first magnetic layer 21 includes at least one of Fe, Co or Ni. The second magnetic layer 22 includes at least one of Fe, Co or Ni. The third magnetic layer 23 includes, for example, $(Fe_{100-x}Co_x)_{100-y}E_y$ (10 atomic %≤x≤50 atomic %, 10 atomic %≤y≤90 atomic %), and the second element E includes at least one selected from the group consisting of Cr, V, Mn, Ti and Sc.

The first magnetic layer 21 and the second magnetic layer 22 do not include the above-mentioned second element. Alternatively, a concentration of the second element in the first magnetic layer 21 and the second magnetic layer 22 is lower than a concentration of the second element in the third magnetic layer 23. The first magnetic layer 21 includes at least one of Fe, Co or Ni. The second magnetic layer 22 includes at least one of Fe, Co or Ni.

For example, the first magnetic layer 21 and the second magnetic layer 22 have positive spin polarization. The third magnetic layer 23 has negative spin polarization.

As a configuration other than the above in the magnetic head 111, the configuration described for the magnetic head 110 may be applied. For example, the first magnetic layer length L21 is longer than the second magnetic layer length L22. Stable oscillation can also be obtained in the magnetic head 111.

For example, as shown in FIG. 4B, the current ic is supplied to the stacked body 20. The current ic is supplied from the electric circuit 20D (see FIG. 2). The current ic has an orientation from the first magnetic layer 21 to the second magnetic layer 22. The electron flow je accompanying the current ic has an orientation from the second magnetic layer 22 to the first magnetic layer 21.

Figure 5:
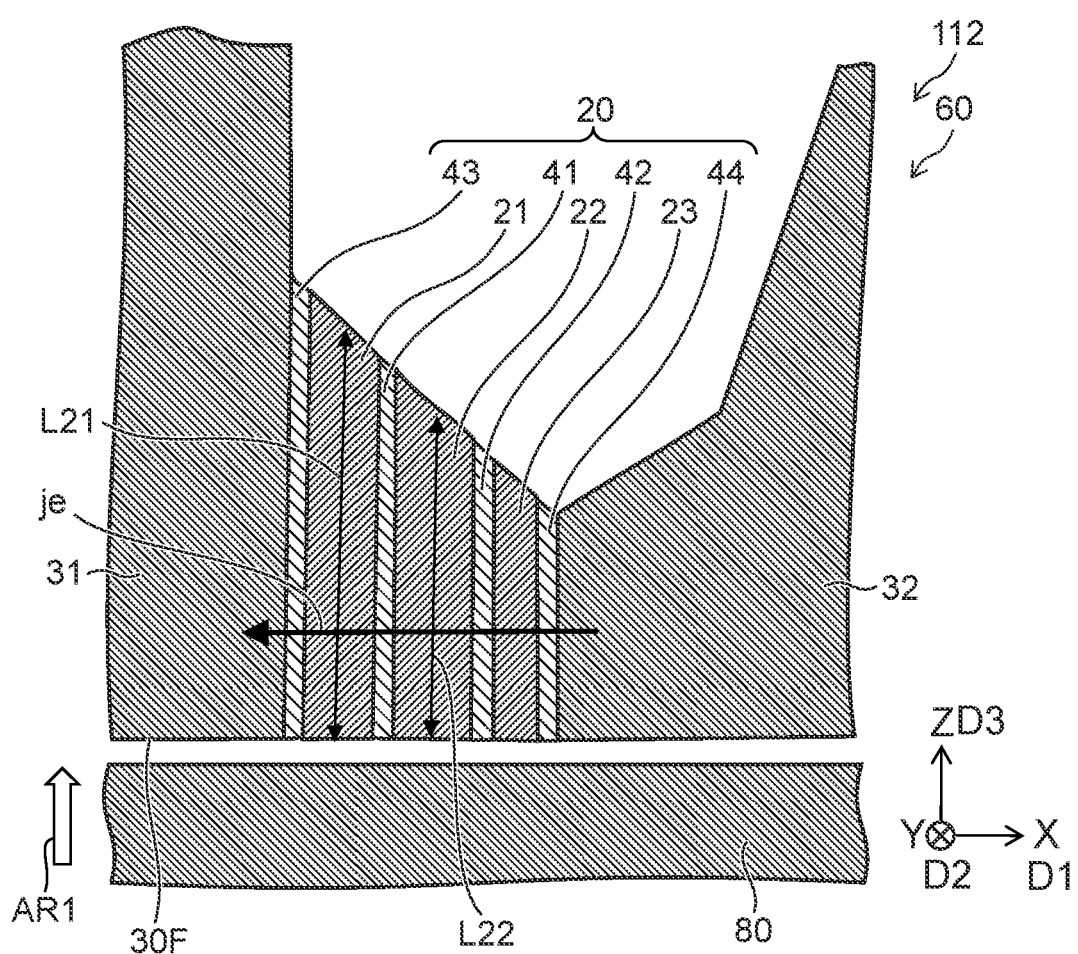
FIG. 5 is a schematic cross-sectional view illustrating a magnetic head according to the first embodiment.

FIG. 5 is a schematic cross-sectional view illustrating a magnetic head according to the first embodiment.

As shown in FIG. 5, in a magnetic head 112 according to the embodiment, the first direction D1 (stacking direction) is along the medium-facing surface 30F. Also in the magnetic head 112, for example, the first magnetic layer length L21 is longer than the second magnetic layer length L22. Other configurations of the magnetic head 112 may be the same as those of the magnetic head 110.

Figure 6:
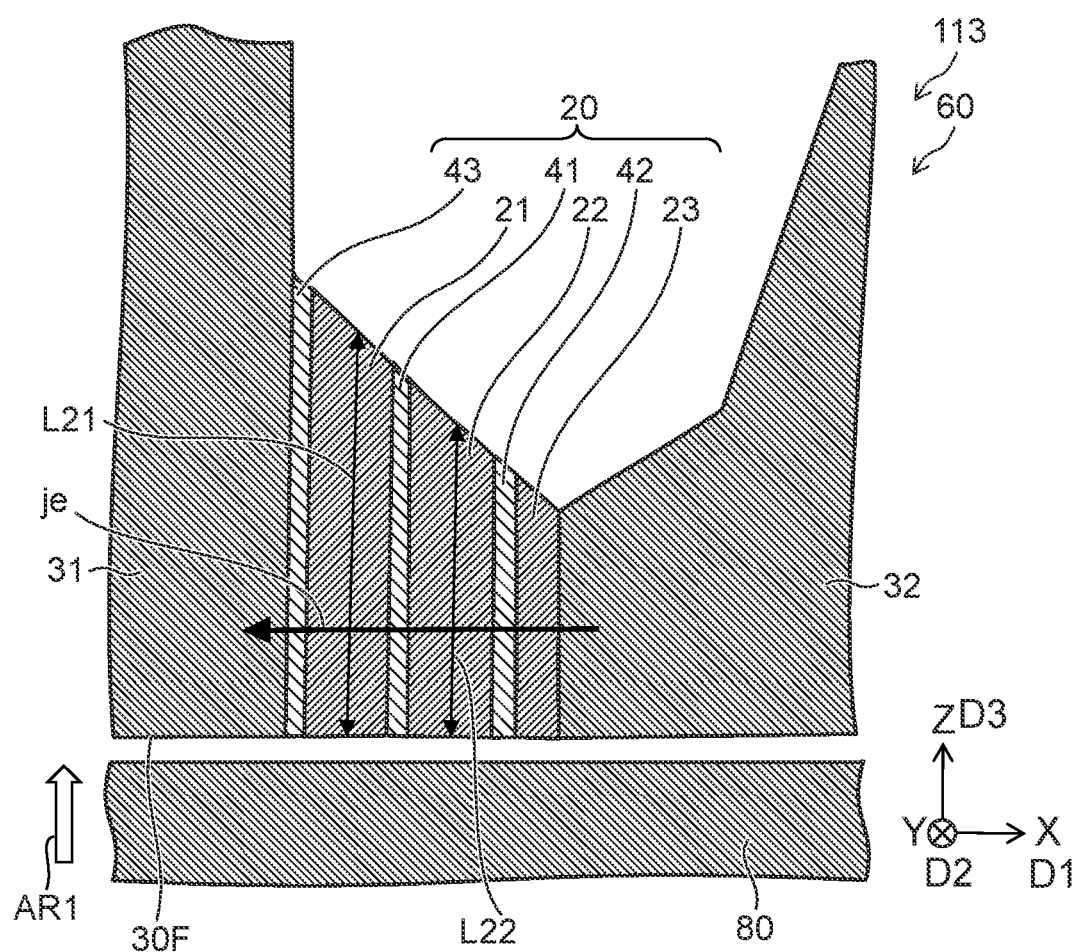
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, in a magnetic head 113 according to the embodiment, the first direction D1 (stacking direction) is along the medium-facing surface 30F. Also in the magnetic head 113, for example, the first magnetic layer length L21 is longer than the second magnetic layer length L22. Other configurations of the magnetic head 113 may be the same as those of the magnetic head 111.

Figure 7:
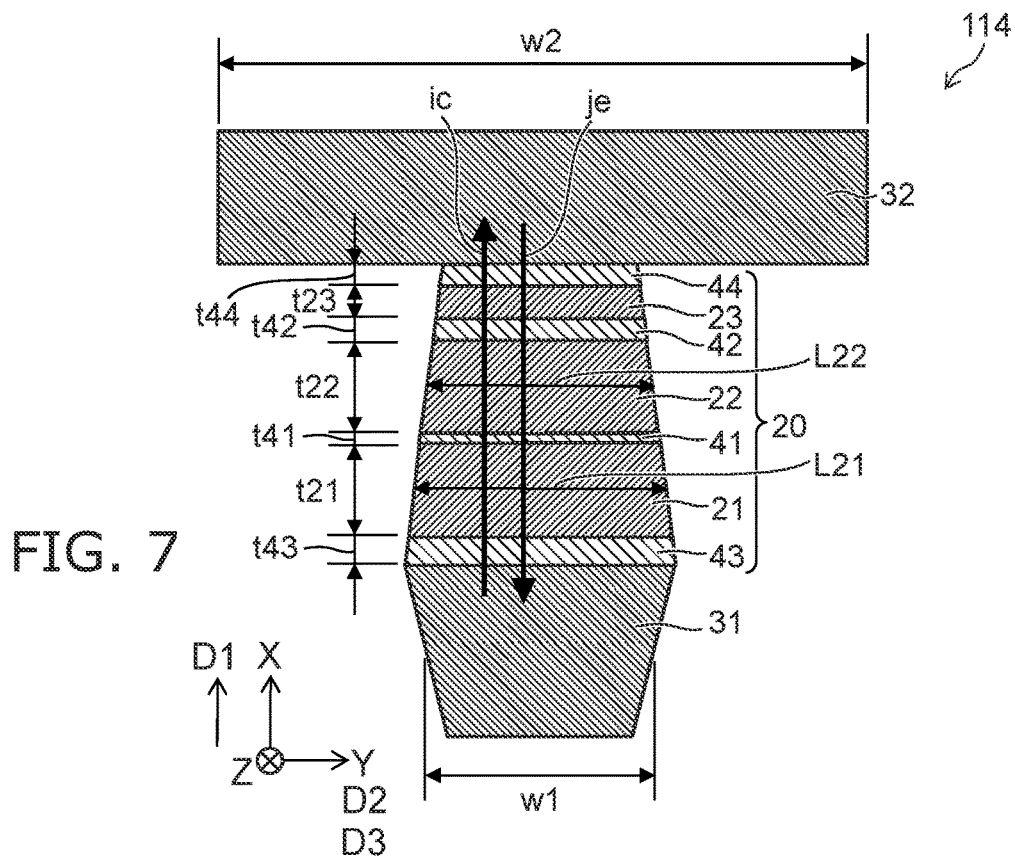
FIG. 7 is a schematic plan view illustrating a magnetic head according to the first embodiment.

FIG. 7 is a schematic plan view illustrating a magnetic head according to the first embodiment.

FIG. 7 corresponds to a plan view seen from the arrow AR1 of FIG. 1A. As shown in FIG. 7, in a magnetic head 114 according to the embodiment, the stacked body 20 includes the first to third magnetic layers 21 to 23 and the first to fourth non-magnetic layers 41 to 44. As shown in FIG. 7, the third direction D3 is along the second direction D2 (Y-axis direction, cross-track direction). The first magnetic layer length L21 of the first magnetic layer 21 along the third direction D3 is longer than the second magnetic layer length L22 of the second magnetic layer 22 along the third direction D3. Other configurations of the magnetic head 114 may be the same as those of the magnetic head 110.

Figure 8:
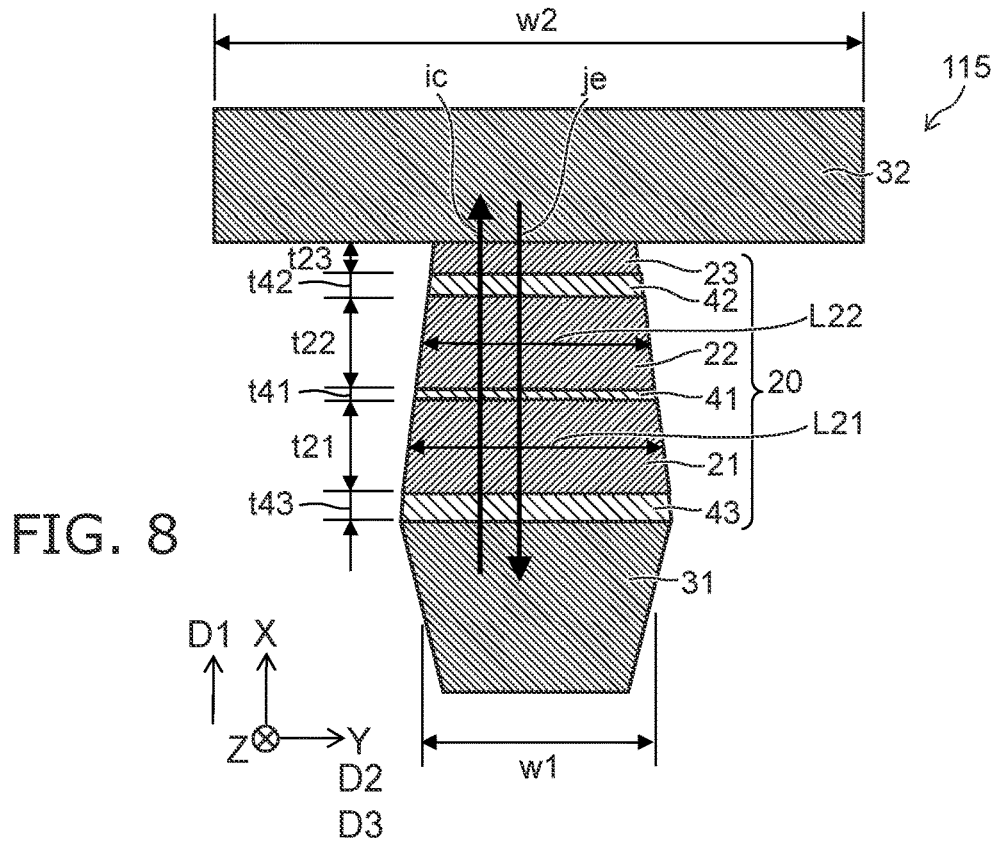
FIG. 8 is a schematic plan view illustrating a magnetic head according to the first embodiment.

FIG. 8 is a schematic plan view illustrating a magnetic head according to the first embodiment.

FIG. 8 corresponds to a plan view seen from the arrow AR1 in FIG. 4A. As shown in FIG. 8, in a magnetic head 115 according to the embodiment, the stacked body 20 includes the first to third magnetic layers 21 to 23 and the first to third non-magnetic layers 41 to 43. As shown in FIG. 8, the third direction D3 is along the second direction D2 (Y-axis direction, cross-track direction). The first magnetic layer length L21 of the first magnetic layer 21 along the third direction D3 is longer than the second magnetic layer length L22 of the second magnetic layer 22 along the third direction D3. Other configurations of the magnetic head 115 may be the same as those of the magnetic head 111.
0058.

Stable oscillation can be obtained also in the magnetic heads 112 to 115.

Second Embodiment

Figure 9A:
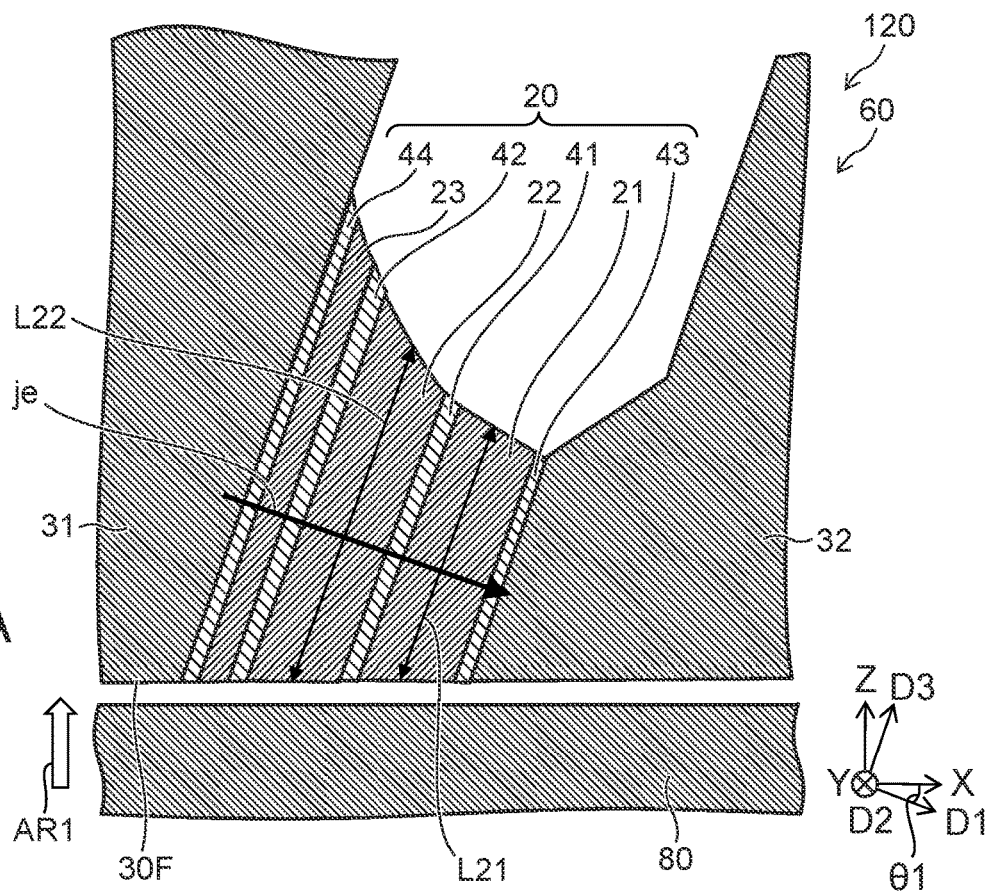
FIGS. 9A and 9B are schematic views illustrating a magnetic head according to a second embodiment.
Figure 9B:
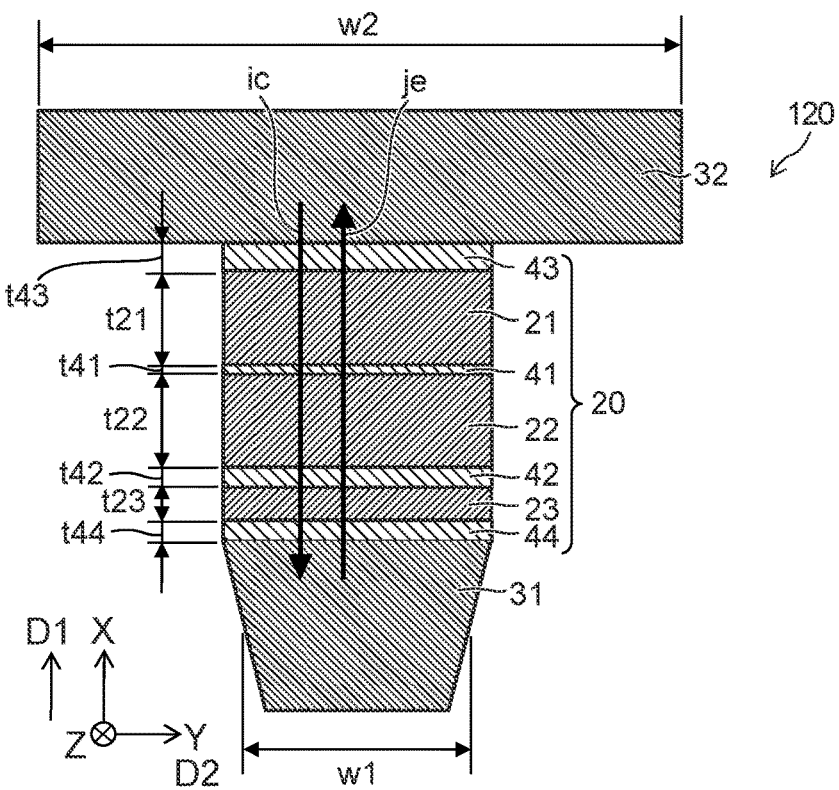

FIGS. 9A and 9B are schematic views illustrating a magnetic head according to a second embodiment.

FIG. 9A is a cross-sectional view. FIG. 9B is a plan view seen from the arrow AR1 of FIG. 9A.

As shown in FIG. 9A, a magnetic head 120 according to the embodiment also includes the first magnetic pole 31, the second magnetic pole 32, and the stacked body 20 provided between the first magnetic pole 31 and the second magnetic pole 32. In the magnetic head 120, the order of the multiple layers included in the stacked body 20 is different from the order of the multiple layers in the magnetic head 110. Other configurations of the magnetic head 120 may be the same as the configuration of the magnetic head 110.

As shown in FIGS. 9A and 9B, in the magnetic head 120, the stacked body 20 includes the first to third magnetic layers 21 to 23 and the first to fourth non-magnetic layers 41 to 44. The second magnetic layer 22 is provided between the first magnetic pole 31 and the first magnetic layer 21. The third magnetic layer 23 is provided between the first magnetic pole 31 and the second magnetic layer 22. The first non-magnetic layer 41 is provided between the second magnetic layer 22 and the first magnetic layer 21. The second non-magnetic layer 42 is provided between the third magnetic layer 23 and the second magnetic layer 22. The third non-magnetic layer 43 is provided between the first magnetic layer 21 and the second magnetic pole 32. The fourth non-magnetic layer 44 is provided between the first magnetic pole 31 and the third magnetic layer 23.

As shown in FIG. 9B, the current ic is supplied to the stacked body 20. The current ic is supplied from the electric circuit 20D (see FIG. 2). The current ic has an orientation from the first magnetic layer 21 to the second magnetic layer 22. The electron flow je accompanying the current ic has an orientation from the second magnetic layer 22 to the first magnetic layer 21.

For example, the spin torque reflected by the second magnetic pole 32 acts on the first magnetic layer 21. For example, the spin torque transmitted from the third magnetic layer 23 is injected into the second magnetic layer 22. It is considered that the first magnetic layer 21 and the second magnetic layer 22 are magnetized in opposite orientations to each other, and these magnetizations are stable and easily oscillate. The first magnetic layer 21 and the second magnetic layer 22 function as, for example, an oscillation layer. The third magnetic layer 23 functions as a spin injection layer. The magnetization of the third magnetic layer 23 is not fixed in a specific direction. MAMR can be performed on the magnetic head 120.

A direction from the second magnetic layer 22 to the first magnetic layer 21 is defined as a first direction D1. A direction perpendicular to the first direction D1 and along the medium-facing surface 30F of the first magnetic pole 31 is defined as a second direction D2. The second direction D2 is, for example, the Y-axis direction (cross-track direction). As shown in FIG. 9B, the first magnetic pole length w1 of the first magnetic pole 31 along the second direction D2 is shorter than the second magnetic pole length w2 of the second magnetic pole 32 along the second direction D2.

As shown in FIG. 9A, one direction perpendicular to the first direction D1 is defined as a third direction D3. In this example, the third direction D3 crosses the second direction D2. In this example, the first direction D1 is inclined with respect to the medium-facing surface 30F. The third direction D3 is inclined with respect to the medium-facing surface 30F. The second magnetic layer length L22 of the second magnetic layer 22 along the third direction D3 is longer than the first magnetic layer length L21 of the first magnetic layer 21 along the third direction D3.

With such a configuration, the magnetic field 31M at the first magnetic pole 31 can be increased. Then, the magnetic field 32M at the second magnetic pole 32 can be suppressed. As a result, the interaction between the first magnetic pole 31 and the stacked body 20 can be increased. Noise generated at the second magnetic pole 32 can be suppressed.

In the embodiment, it is easy to obtain stable oscillation in the stacked body 20. As a result, stable MAMR can be performed. According to the embodiment, it is possible to provide a magnetic head capable of improving the recording density.

In the magnetic head 120, the fourth non-magnetic layer 44 includes, for example, at least one selected from the group consisting of Cu, Au, Cr, Al, V and Ag. The third magnetic layer 23 includes, for example, $(Fe_{100-x}Co_x)_{100-y}E_y$ (10 atomic %≤x≤50 atomic %, 10 atomic %≤y≤90 atomic %), and the second element E includes at least one selected from the group consisting of Cr, V, Mn, Ti and Sc.

The first magnetic layer 21 and the second magnetic layer 22 do not include the above-mentioned second element. Alternatively, a concentration of the second element in the first magnetic layer 21 and the second magnetic layer 22 is lower than a concentration of the second element in the third magnetic layer 23. The first magnetic layer 21 includes at least one of Fe, Co or Ni. The second magnetic layer 22 includes at least one of Fe, Co or Ni.

For example, the first magnetic layer 21 and the second magnetic layer 22 have positive spin polarization. The third magnetic layer 23 has negative spin polarization. In such a stacked body 20, high-efficiency oscillation can be obtained.

For example, the spin torque transmitted from the first magnetic pole 31 is injected into the third magnetic layer 23. It is considered that in the third magnetic layer 23, occurrence of magnetization parallel to the magnetization of the first magnetic pole 31 stabilizes the spin torque transmitted from the third magnetic layer 23 to the second magnetic layer 22. It is considered that the magnetization of the first magnetic layer 21 and the second magnetic layer 22 is likely to oscillate.

The configuration described for the magnetic head 110 can be applied to the magnetic head 120. For example, in the magnetic head 120, the first non-magnetic layer 41 includes at least one first element selected from the group consisting of Ru, Ir, Ta and W. The first non-magnetic layer thickness t41 (see FIG. 9B) of the first non-magnetic layer 41 along the first direction D1 is, for example, not less than 0.2 nm and not more than 3 nm. The antiferromagnetic coupling between the first magnetic layer 21 and the second magnetic layer 22 substantially cancels, for example, the magnetic field due to the magnetization of the first magnetic layer 21 and the magnetic field due to the magnetization of the second magnetic layer 22. As a result, the vertical component (component along the Z-axis direction) of the alternating magnetic field generated from the stacked body 20 is suppressed. On the other hand, the in-plane component of the alternating magnetic field (the component along the X-Y plane) strengthens. In the embodiment, for example, the SNR is improved by suppressing the vertical component (component along the Z-axis direction) of the alternating magnetic field generated from the stacked body 20.

Figure 10A:
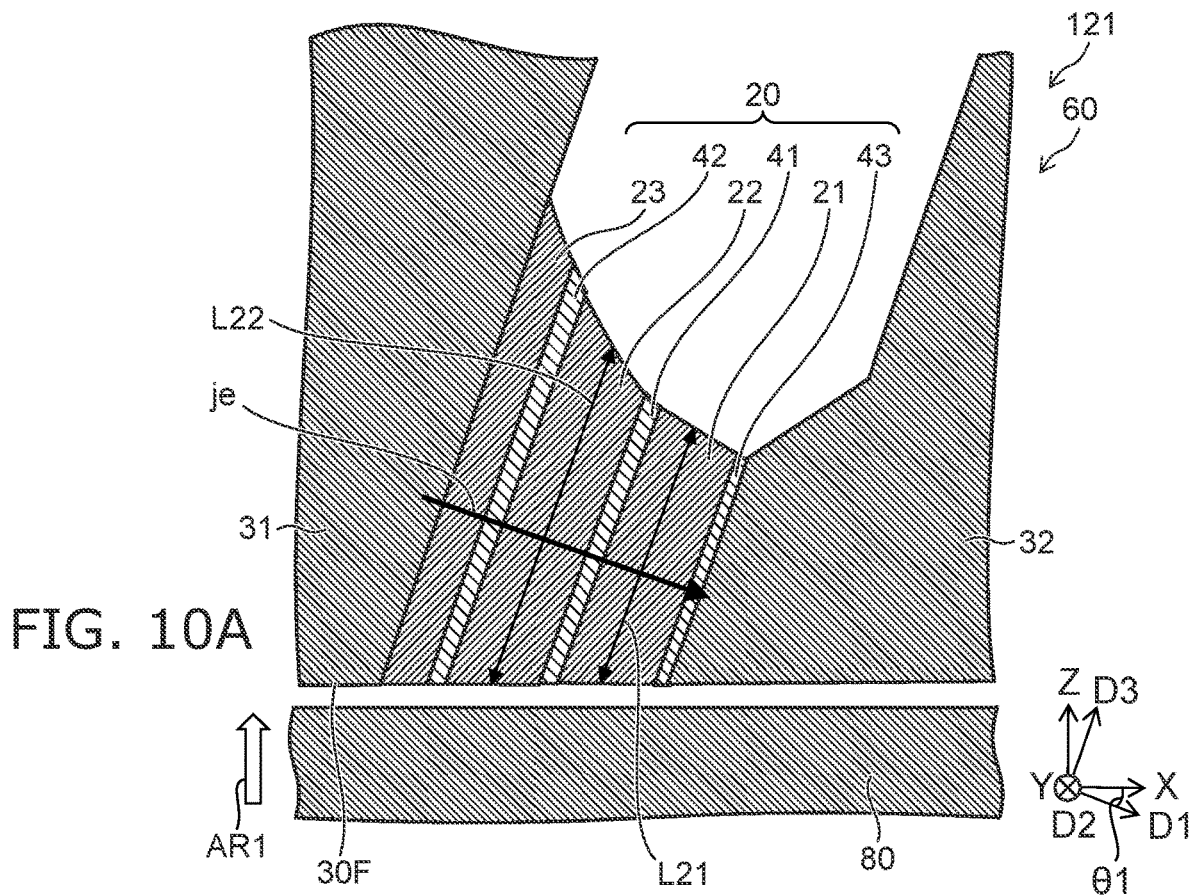
FIGS. 10A and 10B are schematic views illustrating a magnetic head according to the second embodiment.
Figure 10B:
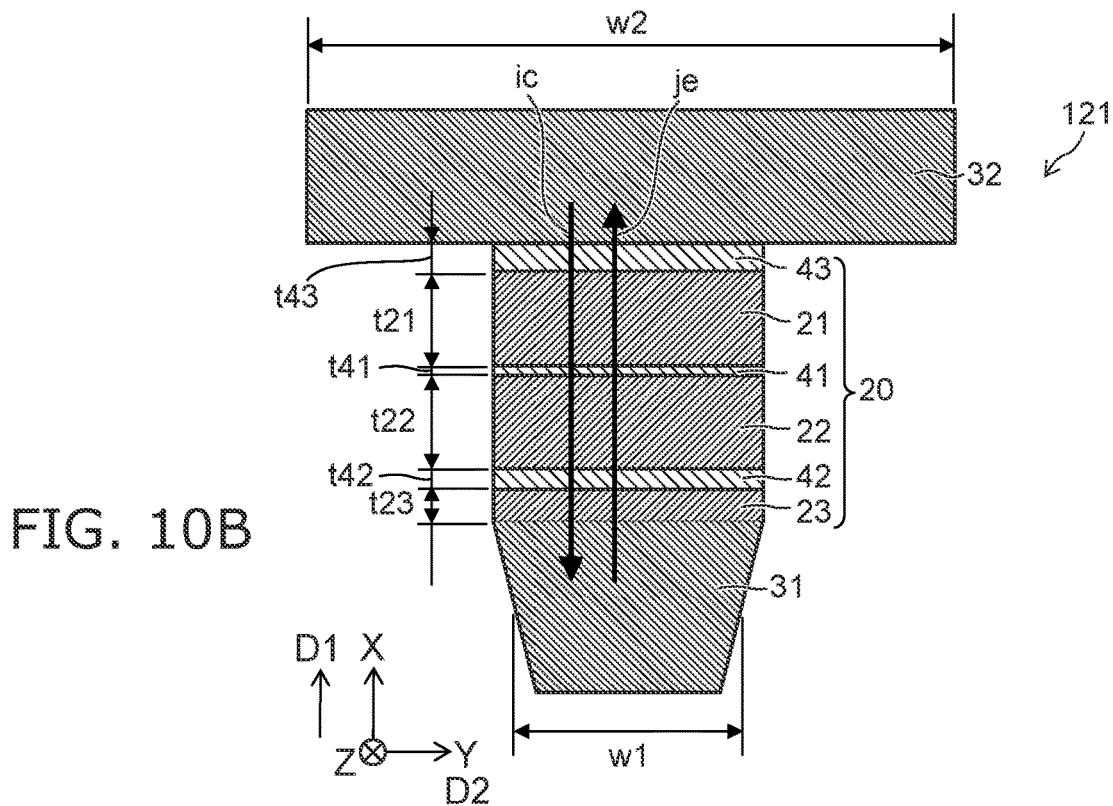

FIGS. 10A and 10B are schematic views illustrating a magnetic head according to the second embodiment.

FIG. 10A is a cross-sectional view. FIG. 10B is a plan view seen from the arrow AR1 of FIG. 10A.

As shown in FIG. 10A, the recording part 60 of a magnetic head 121 also includes the first magnetic pole 31, the second magnetic pole 32, and the laminated body 20 provided between the first magnetic pole 31 and the second magnetic pole 32. As shown in FIGS. 10A and 10B, the stacked body 20 includes the first to third magnetic layers 21 to 23 and the first to third non-magnetic layers 41 to 43. The second magnetic layer 22 is provided between the first magnetic layer 21 and the second magnetic pole 32. The third magnetic layer 23 is provided between the second magnetic layer 22 and the second magnetic pole 32. The first non-magnetic layer 41 is provided between the first magnetic layer 21 and the second magnetic layer 22. The second non-magnetic layer 42 is provided between the second magnetic layer 22 and the third magnetic layer 23. The third non-magnetic layer 43 is provided between the first magnetic pole 31 and the first magnetic layer 21. For example, the third magnetic layer 23 may be in contact with the second magnetic pole 32.

In the magnetic head 121, the first magnetic layer 21 includes at least one of Fe, Co or Ni. The second magnetic layer 22 includes at least one of Fe, Co or Ni. The third magnetic layer 23 includes, for example, $(Fe_{100-x}Co_x)_{100-y}E_y$ (10 atomic %≤x≤50 atomic %, 10 atomic %≤y≤90 atomic %), and the second element E includes at least one selected from the group consisting of Cr, V, Mn, Ti and Sc.

The first magnetic layer 21 and the second magnetic layer 22 do not include the above-mentioned second element. Alternatively, a concentration of the second element in the first magnetic layer 21 and the second magnetic layer 22 is lower than a concentration of the second element in the third magnetic layer 23. The first magnetic layer 21 includes at least one of Fe, Co or Ni. The second magnetic layer 22 includes at least one of Fe, Co and Ni.

For example, the first magnetic layer 21 and the second magnetic layer 22 have positive spin polarization. The third magnetic layer 23 has negative spin polarization.

As a configuration other than the above in the magnetic head 121, the configuration described for the magnetic head 120 may be applied. For example, the first magnetic layer length L21 is longer than the second magnetic layer length L22. Stable oscillation can also be obtained in the magnetic head 121.

For example, as shown in FIG. 10B, the current ic is supplied to the stacked body 20. The current ic is supplied from the electric circuit 20D (see FIG. 2). The current ic has an orientation from the first magnetic layer 21 to the second magnetic layer 22. The electron flow je accompanying the current ic has an orientation from the second magnetic layer 22 to the first magnetic layer 21.

Figure 11:
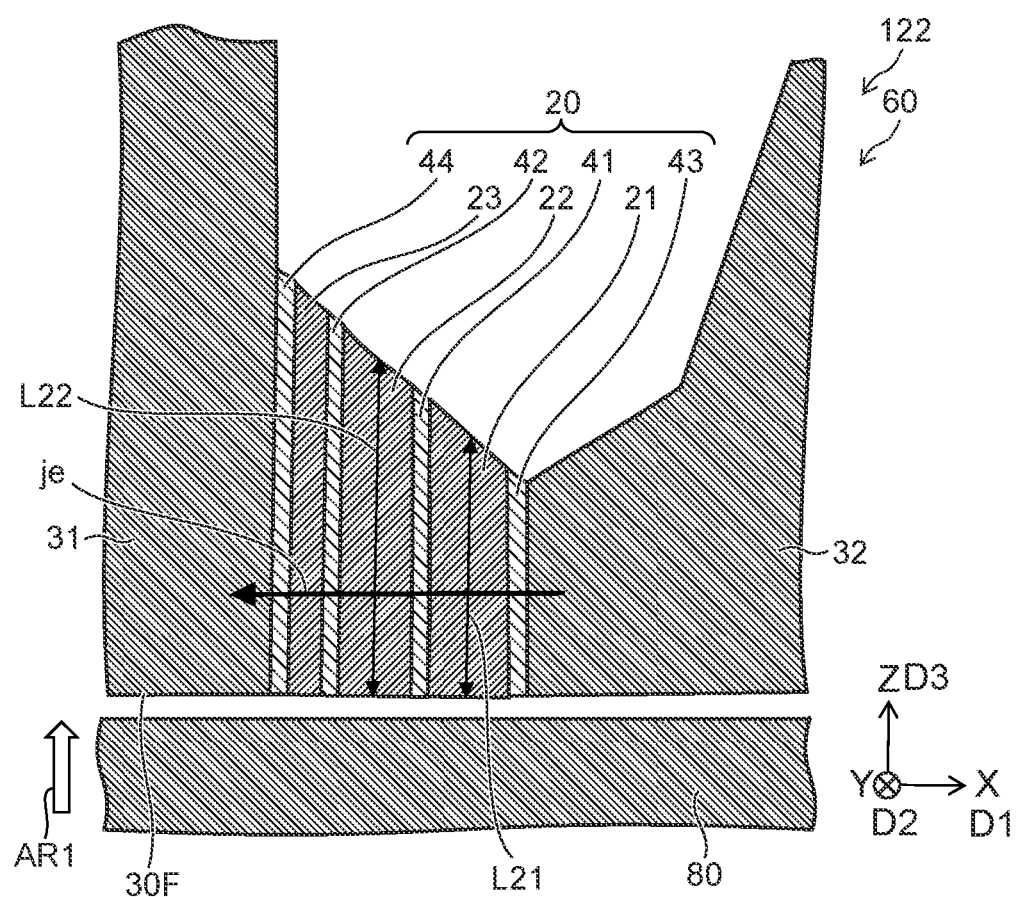
FIG. 11 is a schematic cross-sectional view illustrating a magnetic head according to the second embodiment.

FIG. 11 is a schematic cross-sectional view illustrating a magnetic head according to the second embodiment.

As shown in FIG. 11, in a magnetic head 122 according to the embodiment, the first direction D1 (stacking direction) is along the medium-facing surface 30F. Also in the magnetic head 122, for example, the first magnetic layer length L21 is longer than the second magnetic layer length L22. Other configurations of the magnetic head 122 may be the same as those of the magnetic head 120.

Figure 12:
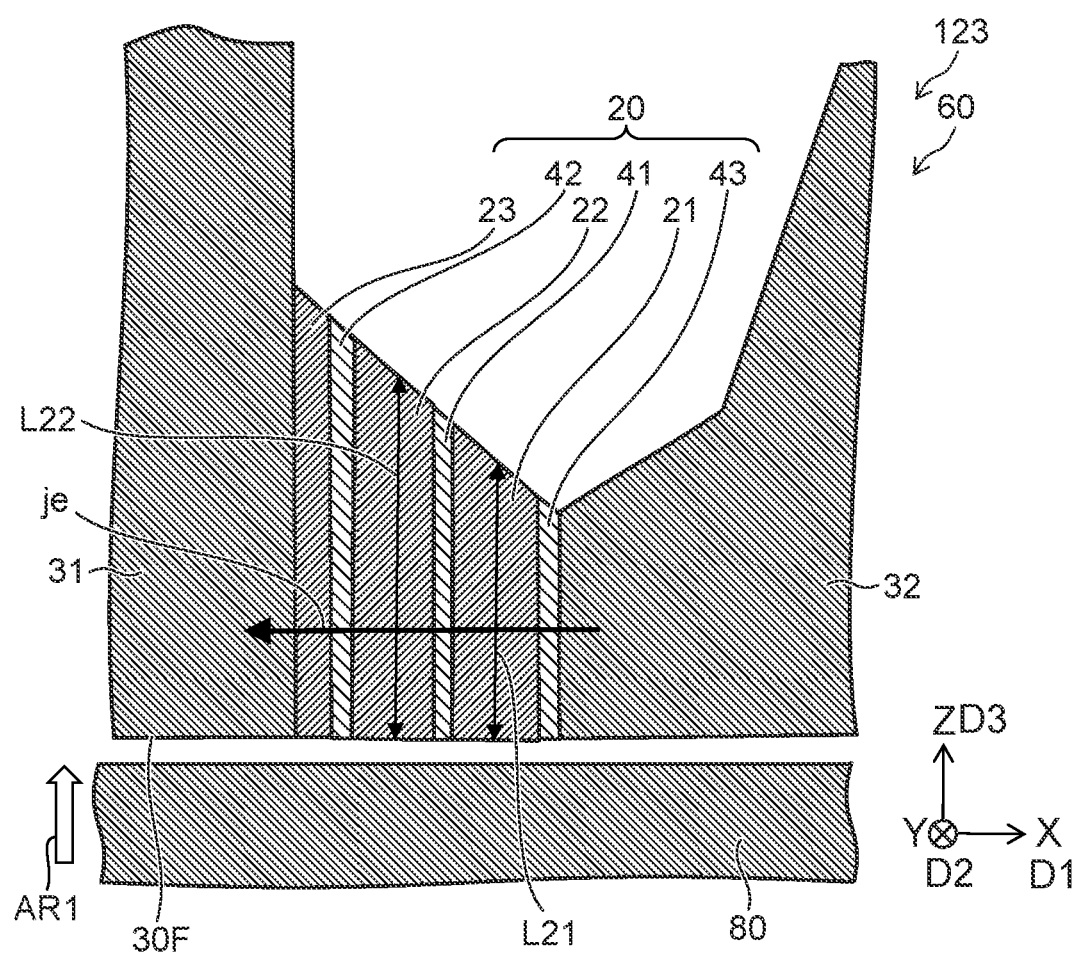
FIG. 12 is a schematic cross-sectional view illustrating a magnetic head according to the second embodiment.

FIG. 12 is a schematic cross-sectional view illustrating a magnetic head according to the second embodiment.

As shown in FIG. 12, in a magnetic head 123 according to the embodiment, the first direction D1 (stacking direction) is along the medium-facing surface 30F. Also in the magnetic head 123, for example, the first magnetic layer length L21 is longer than the second magnetic layer length L22. Other configurations of the magnetic head 123 may be the same as those of the magnetic head 121.

Figure 13:
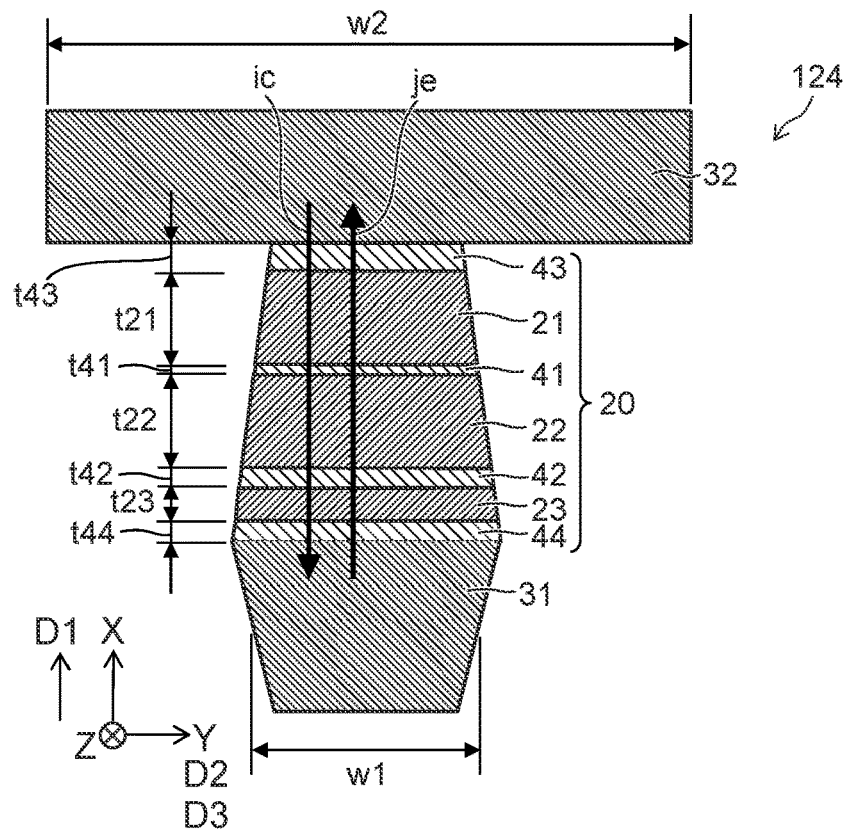
FIG. 13 is a schematic plan view illustrating a magnetic head according to the second embodiment.

FIG. 13 is a schematic plan view illustrating a magnetic head according to the second embodiment.

FIG. 13 corresponds to the plan view seen from the arrow AR1 of FIG. 9A. As shown in FIG. 13, in a magnetic head 124 according to the embodiment, the stacked body 20 includes the first to third magnetic layers 21 to 23 and the first to fourth non-magnetic layers 41 to 44. As shown in FIG. 13, the third direction D3 is along the second direction D2 (Y-axis direction, cross-track direction). The first magnetic layer length L21 of the first magnetic layer 21 along the third direction D3 is longer than the second magnetic layer length L22 of the second magnetic layer 22 along the third direction D3. Other configurations of the magnetic head 124 may be the same as those of the magnetic head 120.

Figure 14:
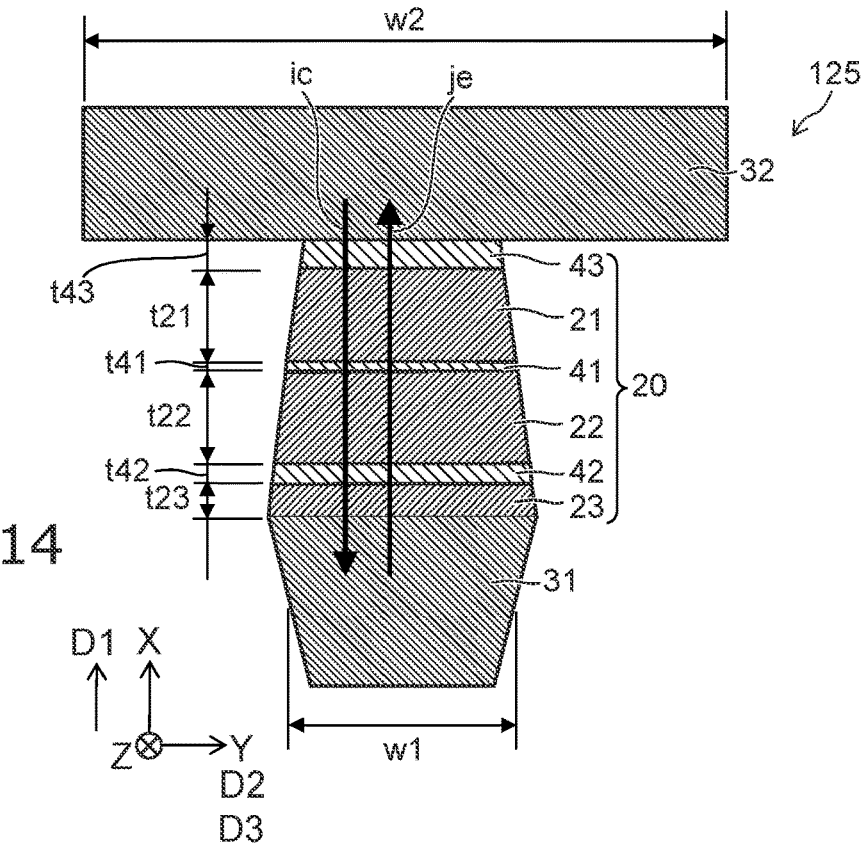
FIG. 14 is a schematic plan view illustrating a magnetic head according to the second embodiment.

FIG. 14 is a schematic plan view illustrating a magnetic head according to the second embodiment.

FIG. 14 corresponds to a plan view seen from the arrow AR1 in FIG. 10A. As shown in FIG. 14, in a magnetic head 125 according to the embodiment, the stacked body 20 includes the first to third magnetic layers 21 to 23 and the first to third non-magnetic layers 41 to 43. As shown in FIG. 14, the third direction D3 is along the second direction D2 (Y-axis direction, cross-track direction). The first magnetic layer length L21 of the first magnetic layer 21 along the third direction D3 is longer than the second magnetic layer length L22 of the second magnetic layer 22 along the third direction D3. Other configurations of the magnetic head 125 may be the same as those of the magnetic head 121.

Stable oscillation can be obtained also in the magnetic heads 122 to 125.

In the magnetic heads 111 to 115 and the magnetic heads 120 to 125, the configurations described with respect to the magnetic head 110 may be applied to the first to third magnetic layers 21 to 23 and the first to third non-magnetic layers 41 to 43.

For example, in the magnetic heads 111 to 115 and the magnetic heads 120 to 125, the magnetic thickness of the first magnetic layer 21 may be not less than 0.8 times and not more than 1.25 times the magnetic thickness of the second magnetic layer 22. For example, the second magnetic layer thickness t22 may be not less than 0.8 times and not more than 1.25 times the first magnetic layer thickness t21. The first magnetic layer thickness t21 is, for example, not less than 5 nm and not more than 15 nm. The second magnetic layer thickness t22 is, for example, not less than 5 nm and not more than 15 nm.

The third magnetic layer thickness t23 is, for example, thinner than the first magnetic layer thickness t21 and thinner than the second magnetic layer thickness t22. The third magnetic layer thickness t23 is, for example, not more than 0.7 times of the first magnetic layer thickness t21 and not more than 0.7 times of the second magnetic layer thickness t22. The first to third magnetic layers 21 to 23 include at least one of Fe, Co or Ni.

In the magnetic heads 111 to 115 and the magnetic heads 120 to 125, the second non-magnetic layer 42 and the third non-magnetic layer 43 include at least one selected from the group consisting of, for example, Cu, Au, Cr, Al, V and Ag. The second non-magnetic layer thickness t42 is, for example, not less than 1 nm and not more than 5 nm. The third non-magnetic layer thickness t43 is, for example, not less than 1 nm and not more than 5 nm.

The magnetic heads 111 to 115 and 120 to 125 according to the embodiment may be used together with the electric circuit 20D (see FIG. 2) already described. The magnetic head and the electric circuit 20D according to the embodiment are included in the magnetic recording device 210 (see FIG. 2) according to the embodiment. The magnetic recording device 210 may include the magnetic recording medium 80.

Hereinafter, an example of the characteristics of the material of the third magnetic layer 23 will be described.

In the first embodiment and the second embodiment, the third magnetic layer 23 includes $(Fe_{100-x}Co_x)_{100-y}E_y$ (10 atomic % ≤ x ≤ 50 atomic %, 10 atomic % ≤ y ≤ 90 atomic %). The second element E includes at least one selected from the group consisting of Cr, V, Mn, Ti and Sc. The composition ratio x and the composition ratio y are atomic percentages (atomic %). The first magnetic layer 21 and the second magnetic layer 22 do not include the second element E. Alternatively, a concentration of the second element E in the first magnetic layer 21 and the second magnetic layer 22 is lower than a concentration of the second element E in the third magnetic layer 23. With such a material, in the third magnetic layer 23, for example, a high saturation magnetic flux density and negative spin polarization having a large absolute value can be easily obtained.

Figure 15A:
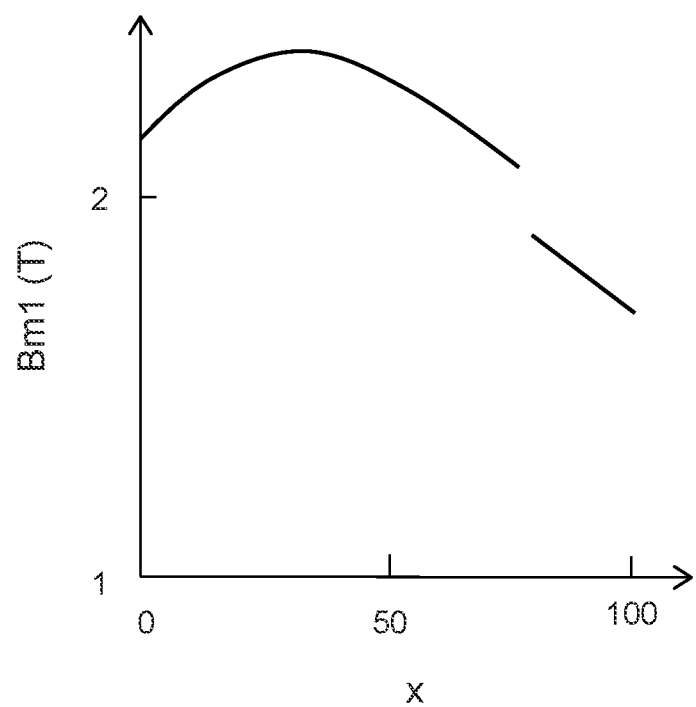
FIGS. 15A and 15B are graphs illustrating characteristics of a magnetic layer included in the magnetic head.
Figure 15B:
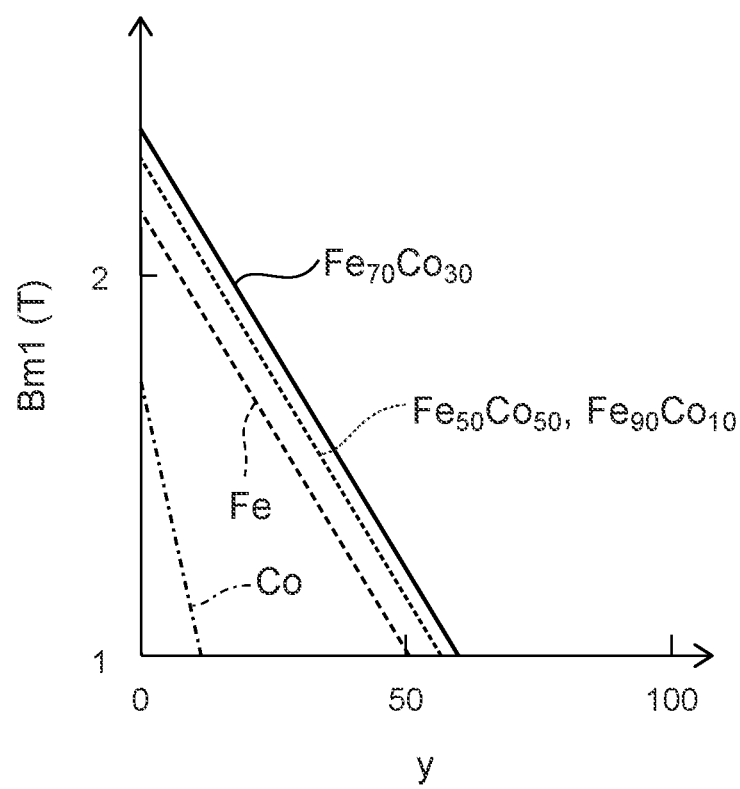

FIGS. 15a and 15B are graphs illustrating characteristics of a magnetic layer included in the magnetic head.

FIG. 15A illustrates the characteristics when the magnetic layer does not include the second element. In this example, the magnetic layer includes $Fe_{100-x}Co_x$. The horizontal axis of FIG. 15A is the composition ratio x (concentration of Co). The vertical axis is a saturation magnetic flux density Bm1. As shown in FIG. 15A, a high saturation magnetic flux density Bm1 is obtained when the composition ratio x is not less than 10 atomic % and not more than 50 atomic %. When the composition ratio x is not more than 75 atomic %, the magnetic layer has a BCC structure. When the composition ratio x exceeds 75 atomic %, the magnetic layer has an fcc structure.

FIG. 15B illustrates the characteristics when the composition ratio of the second element in the magnetic layer is changed. The horizontal axis of FIG. 15B is the composition ratio y. In this example, the second element E is Cr. The vertical axis is the saturation magnetic flux density Bm1. As shown in FIG. 15B, when the composition ratio y is high, the saturation magnetic flux density Bm1 is obtained. When the magnetic layer includes $Fe_{50}Co_{50}$ or $Fe_{90}Co_{10}$, substantially the same characteristics is obtained. When the magnetic layer includes $Fe_{70}Co_{30}$, a higher saturation magnetic flux density Bm1 is obtained at the same composition ratio y as compared with other compositions. When the magnetic layer includes the second element, the composition ratio x is preferably not less than 10 atomic % and not more than 50 atomic %.

Figure 16:
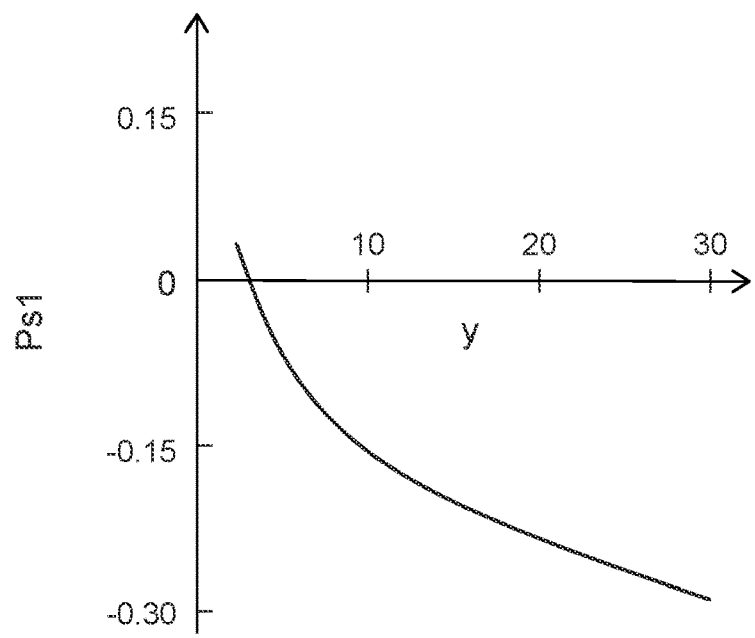
FIG. 16 is a graph illustrating characteristics of the magnetic layer included in the magnetic head.

FIG. 16 is a graph illustrating characteristics of the magnetic layer included in the magnetic head.

FIG. 16 illustrates the change in spin polarization of the magnetic layer when the composition ratio y is changed when the composition ratio of Co to Fe is fixed. The horizontal axis of FIG. 16 is the composition ratio y of the second element E. The vertical axis is spin polarization Ps1 (spin polarization value). As shown in FIG. 16, when the composition ratio y of the second element E is not less than 3 atomic %, negative spin polarization Ps1 is obtained. When the composition ratio y is high, the absolute value of the negative spin polarization Ps1 is increased. When the composition ratio y is not less than 10 atomic %, negative spin polarization Ps1 having a large absolute value can be obtained. For example, the composition ratio y may be not less than 10 atomic % and not more than 30 atomic %.

As can be seen from FIGS. 15B and 16, in the embodiment, the composition ratio x of Co is preferably not less than 10 atomic % and not more than 50 atomic %, and the composition ratio y of the second element E is preferably not less than 10 atomic %. The composition ratio y of the second element E is preferably not more than 90 atomic %. As a result, a high saturation magnetic flux density Bm1 can be obtained. In the embodiment, the composition ratio y of the second element E may be not less than 10 atomic % and not more than 50 atomic %.

Figure 17:
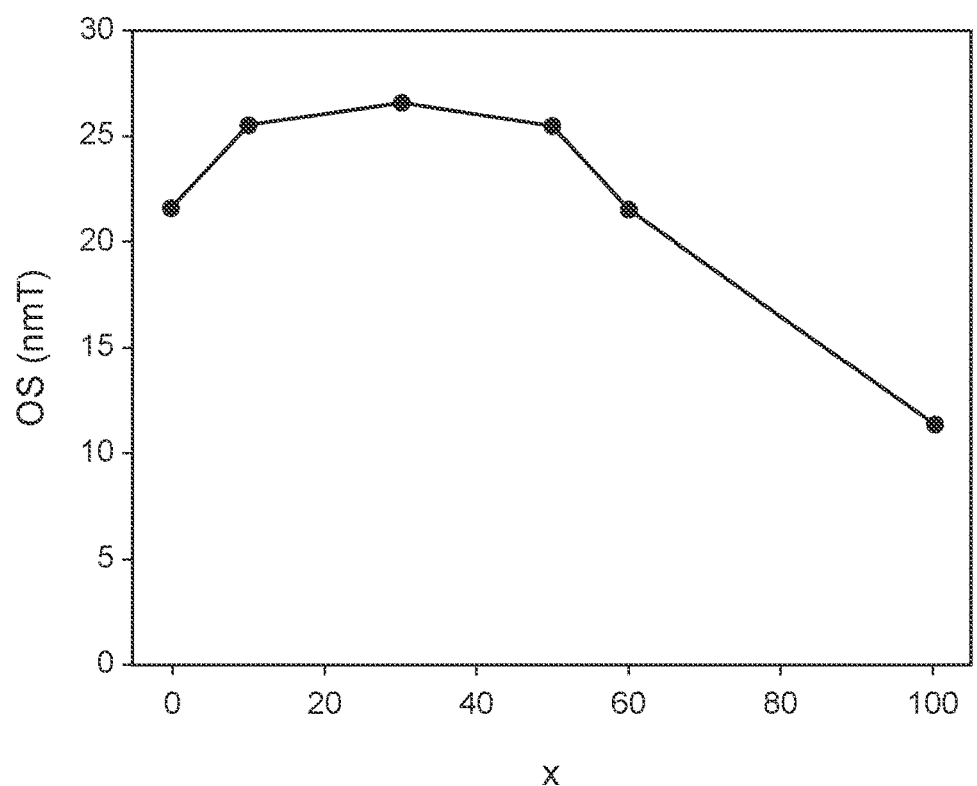
FIG. 17 is a graph illustrating characteristics of the magnetic layer included in the magnetic head.

FIG. 17 is a graph illustrating characteristics of the magnetic layer included in the magnetic head.

FIG. 17 illustrates an oscillation strength OS when the composition of the third magnetic layer 23 is changed. In this example, the composition ratio y is 20 atomic %, and the composition ratio x of Co is changed. The second element E is Cr. The horizontal axis of FIG. 17 is the composition ratio x. The vertical axis is the oscillation strength OS. As can be seen from FIG. 17, when the composition ratio x is not less than 10 atomic % and not more than 50 atomic %, a high oscillation strength OS can be obtained. Under this condition, for example, the recording density by MAMR is likely to be improved. The composition ratio x is more preferably not less than 25 atomic % and more than 35 atomic %. The high oscillation strength OS is stable and is easily obtained.

As described above, it is preferable that the third magnetic layer 23 (for example, a magnetic layer having negative spin polarization) has the above composition. As a result, for example, a high saturation magnetic flux density Bm1 and negative spin polarization Ps1 having a large absolute value can be easily obtained. For example, stable oscillation can be easily obtained.

In the embodiment, the third magnetic layer thickness t23 of the third magnetic layer 23 is preferably not less than 5 nm and not more than 15 nm, for example. Each of the first non-magnetic layer thickness t41 of the first non-magnetic layer 41 and the second non-magnetic layer thickness t42 of the second non-magnetic layer 42 is preferably not less than 0.5 nm and not more than 6 nm, for example.

Figure 18:
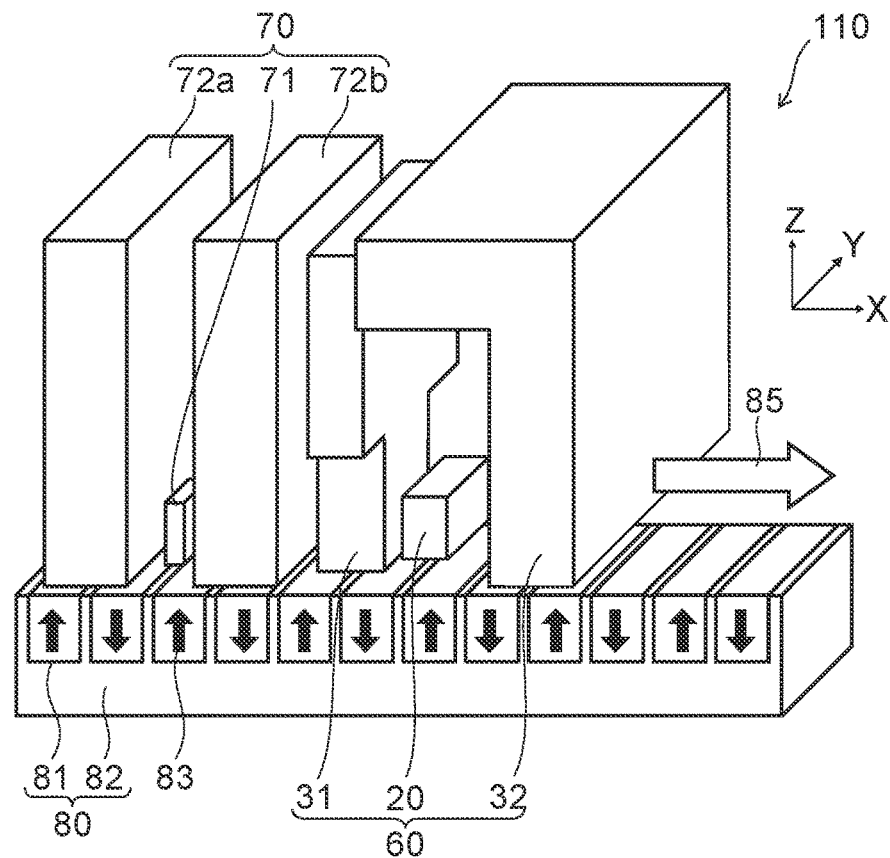
FIG. 18 is a schematic perspective view illustrating the magnetic recording device according to the embodiment.

FIG. 18 is a schematic perspective view illustrating the magnetic recording device according to the embodiment.

As shown in FIG. 18, the magnetic head according to the embodiment (for example, magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

As shown in FIG. 18, the magnetic recording medium 80 moves relative to the magnetic head 110 in a direction of a medium movement direction 85. The magnetic head 110 controls the information corresponding to the magnetization 83 of the magnetic recording layer 81 at an arbitrary position. The magnetic head 110 reproduces the information corresponding to the magnetization 83 of the magnetic recording layer 81 at an arbitrary position.

Figure 19:
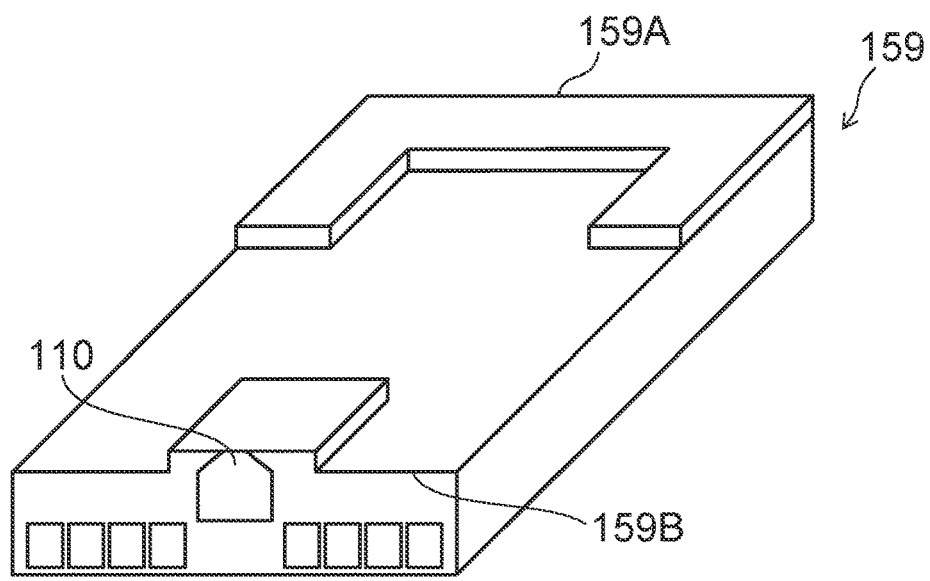
FIG. 19 is a schematic perspective view illustrating a part of the magnetic recording device according to the embodiment.

FIG. 19 is a schematic perspective view illustrating a part of the magnetic recording device according to the embodiment.

FIG. 19 illustrates a head slider.

The magnetic head 110 is provided on the head slider 159. The head slider 159 includes, for example, $Al_2O_3$/TiC and the like. The head slider 159 moves relative to the magnetic recording medium while floating or contacting the magnetic recording medium.

The head slider 159 has, for example, an air inflow side 159A and an air outflow side 159B. The magnetic head 110 is provided on a side surface of the air outflow side 159B of the head slider 159. As a result, the magnetic head 110 moves relative to the magnetic recording medium while floating or contacting the magnetic recording medium.

Figure 20:
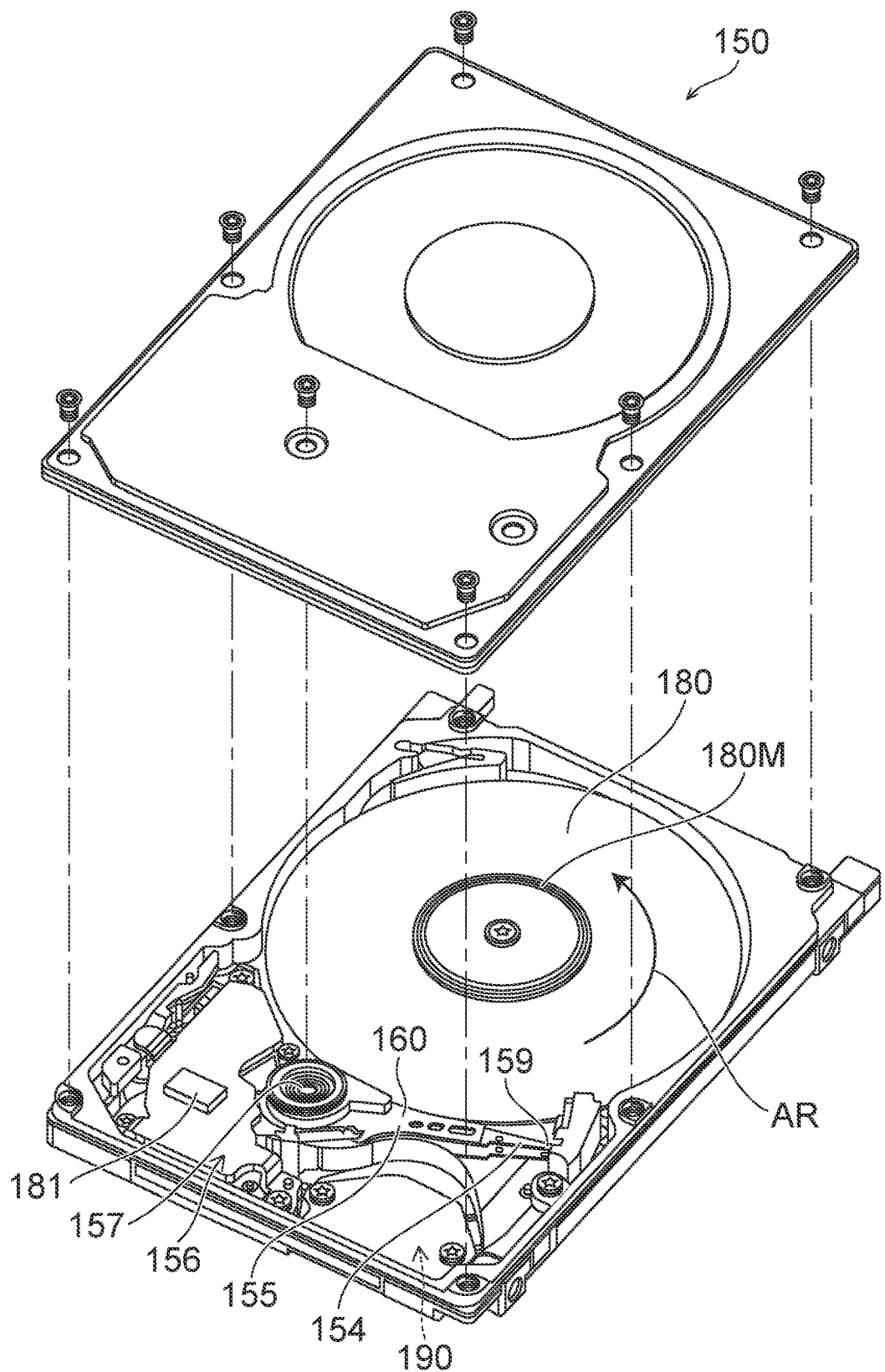
FIG. 20 is a schematic perspective view illustrating the magnetic recording device according to the embodiment.

FIG. 20 is a schematic perspective view illustrating the magnetic recording device according to the embodiment.

Figure 21A:
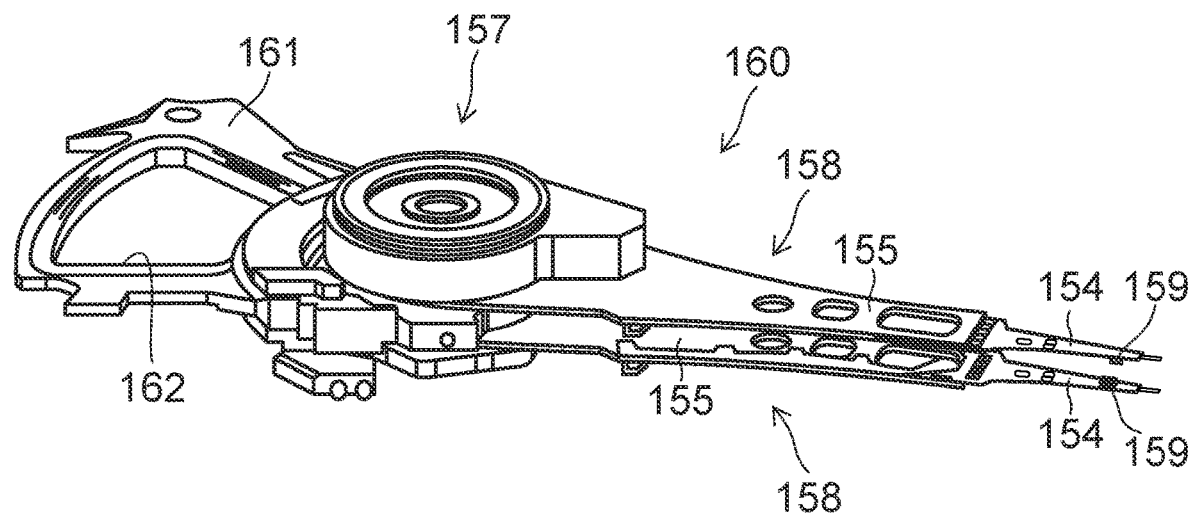
FIGS. 21A and 21B are schematic perspective views illustrating a part of the magnetic recording device according to the embodiment.
Figure 21B:
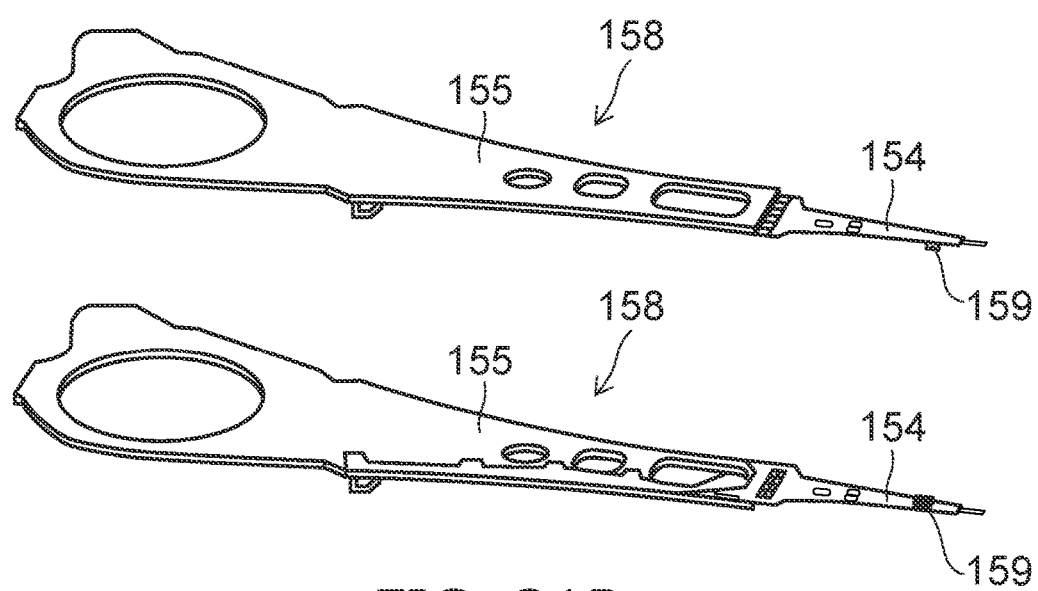

FIGS. 21A and 21B are schematic perspective views illustrating a part of the magnetic recording device according to the embodiment.

As shown in FIG. 20, in the magnetic recording and reproducing device 150 according to the embodiment, a rotary actuator is used. The recording medium disk 180 is mounted on a spindle motor 180M. The recording medium disk 180 is rotated in the direction of the arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. The magnetic head according to the embodiment is provided near the tip of the head slider 159.

When the recording medium disk 180 rotates, the downward pressure due to the suspension 154 and the pressure generated on the medium-facing surface (ABS) of the head slider 159 are balanced. The distance between the medium-facing surface of the head slider 159 and the surface of the recording medium disk 180 is a predetermined fly height. In the embodiment, the head slider 159 may be in contact with the recording medium disk 180. For example, a contact-sliding type may be applied.

The suspension 154 is connected to one end of the arm 155 (for example, an actuator arm). The arm 155 includes, for example, a bobbin part and the like. The bobbin part holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin part of the arm 155. The magnetic circuit includes a permanent magnet and an opposing yoke. The drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

FIG. 21A illustrates the configuration of a part of the magnetic recording device and is an enlarged perspective view of a head stack assembly 160.

FIG. 21B is a perspective view illustrating a magnetic head assembly (head gimbal assembly: HGA) 158 that is a part of the head stack assembly 160.

As shown in FIG. 21A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 21B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, a lead wire (not shown) for recording and reproducing a signal. The suspension 154 may include, for example, a lead wire (not shown) for a heater for adjusting the fly height. The suspension 154 may include a lead wire (not shown) for, for example, a spin transfer torque oscillator. These lead wires and multiple electrodes provided on the magnetic head are electrically connected.

The signal processor 190 is provided in the magnetic recording device 150. The signal processor 190 records and reproduces the signal on the magnetic recording medium using the magnetic head. In the signal processor 190, the input/output lines of the signal processor 190 are connected to, for example, the electrode pads of the head gimbal assembly 158, and electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces the signal on the magnetic recording medium using the magnetic head.

For example, the recording medium disk 180 is used as the above magnetic recording medium. The movable part includes, for example, the head slider 159. The position controller includes, for example, the head gimbal assembly 158.

The embodiment may include the following configuration (for example, a technical proposal).

Configuration 1
  A magnetic head, comprising:
  a first magnetic pole;
  a second magnetic pole; and
  a stacked body provided between the first magnetic pole and the second magnetic pole,
  the stacked body including
    a first magnetic layer,
    a second magnetic layer provided between the first magnetic layer and the second magnetic pole,
    a third magnetic layer provided between the second magnetic layer and the second magnetic pole,
    a first non-magnetic layer provided between the first magnetic layer and the second magnetic layer,
    a second non-magnetic layer provided between the second magnetic layer and the third magnetic layer,
    a third non-magnetic layer provided between the first magnetic pole and the first magnetic layer, and
    a fourth non-magnetic layer provided between the third magnetic layer and the second magnetic pole,
  the fourth non-magnetic layer including at least one selected from the group consisting of Cu, Au, Al, V and Ag,
  the third magnetic layer including $(Fe_{100-x}Co_x)_{100-y}E_y$ (10 atomic % ≤ x ≤ 50 atomic %, 10 atomic % ≤ y ≤ 90 atomic %), a second element E including at least one selected from the group consisting of Cr, V, Mn, Ti and Sc,
  a first magnetic pole length of the first magnetic pole along a second direction being shorter than a second magnetic pole length of the second magnetic pole along the second direction, the second direction being perpendicular to a first direction from the first magnetic layer to the second magnetic layer, and being along a medium-facing surface of the first magnetic pole, and
  a first magnetic layer length of the first magnetic layer along a third direction being longer than a second magnetic layer length of the second magnetic layer along the third direction, the third direction being perpendicular to the first direction.

Configuration 2
  A magnetic head, comprising:
  a first magnetic pole;
  a second magnetic pole; and
  a stacked body provided between the first magnetic pole and the second magnetic pole,
  the stacked body including
    a first magnetic layer,
    a second magnetic layer provided between the first magnetic layer and the second magnetic pole,
    a third magnetic layer provided between the second magnetic layer and the second magnetic pole,
    a first non-magnetic layer provided between the first magnetic layer and the second magnetic layer,
    a second non-magnetic layer provided between the second magnetic layer and the third magnetic layer, and
    a third non-magnetic layer provided between the first magnetic pole and the first magnetic layer,
  the third magnetic layer including $(Fe_{100-x}Co_x)_{100-y}E_y$ (10 atomic % ≤ x ≤ 50 atomic %, 10 atomic % ≤ y ≤ 90 atomic %), a second element E including at least one selected from the group consisting of Cr, V, Mn, Ti and Sc,
  the third magnetic layer being in contact with the second magnetic pole,
  a first magnetic pole length of the first magnetic pole along a second direction being shorter than a second magnetic pole length of the second magnetic pole along the second direction, the second direction being perpendicular to a first direction from the first magnetic layer to the second magnetic layer, and being along a medium-facing surface of the first magnetic pole, and
  a first magnetic layer length of the first magnetic layer along a third direction being longer than a second magnetic layer length of the second magnetic layer along the third direction, the third direction being perpendicular to the first direction.

Configuration 3
  The magnetic head according to Configuration 1 or 2, wherein
  the first magnetic layer includes at least one of Fe, Co or Ni, and
  the second magnetic layer includes at least one of Fe, Co or Ni.

Configuration 4
  The magnetic head according to any one of Configurations 1 to 3, wherein
  the third direction crosses the second direction.

Configuration 5
  The magnetic head according to Configuration 4, wherein
  the first direction is inclined with respect to the medium-facing surface.

Configuration 6
  The magnetic head according to any one of Configurations 1 to 3, wherein
  the third direction is along the second direction.

Configuration 7
  A magnetic head, comprising:
  a first magnetic pole;
  a second magnetic pole; and
  a stacked body provided between the first magnetic pole and the second magnetic pole,
  the stacked body including
    a first magnetic layer,
    a second magnetic layer provided between the first magnetic pole and the first magnetic layer,
    a third magnetic layer provided between the first magnetic pole and the second magnetic layer,
    a first non-magnetic layer provided between the second magnetic layer and the first magnetic layer,
    a second non-magnetic layer provided between the third magnetic layer and the second magnetic layer,
    a third non-magnetic layer provided between the first magnetic layer and the second magnetic pole, and
    a fourth non-magnetic layer provided between the third magnetic layer and the first magnetic pole,
  the fourth non-magnetic layer including at east one selected from the group consisting of Cu, Au, Al, V and Ag,
  the third magnetic layer including $(Fe_{100-x}Co_x)_{100-y}E_y$ (10 atomic % ≤ x ≤ 50 atomic %, 10 atomic % ≤ y ≤ 90 atomic %), a second element E including at least one selected from the group consisting of Cr, V, Mn, Ti and Sc,
  a first magnetic pole length of the first magnet pole along a second direction being shorter than a second magnetic pole length of the second magnetic pole along the second, direction, the second direction being perpendicular to a first direction from the second magnetic layer to the first magnetic layer, and being along a medium-facing surface of the first magnetic pole, and
  a second magnetic layer length of the second magnetic layer along a third direction being longer than a first magnetic layer length of the first magnetic layer along the third direction, the third direction being perpendicular to the first direction.

Configuration 8
  A magnetic head, comprising:
  a first magnetic pole;
  a second magnetic pole; and
  a stacked body provided between the first magnetic pole and the second magnetic pole,
  the stacked body including
    a first magnetic layer,
    a second magnetic layer provided between the first magnetic pole and the first magnetic layer,
    a third magnetic layer provided between the first magnetic pole and the second magnetic layer,
    a first non-magnetic layer provided between the second magnetic layer and the first magnetic layer,
    a second non-magnetic layer provided between the third magnetic layer and the second magnetic layer, and
    a third non-magnetic layer provided between the first magnetic layer and the second magnetic pole,
  the third magnetic layer including $(Fe_{100-x}Co_x)_{100-y}E_y$ (10 atomic % ≤ x ≤ 50 atomic %, 10 atomic % ≤ y ≤ 90 atomic %), a second element E including at least one selected from the group consisting of Cr, V, Mn, Ti and Sc,
  the third magnetic layer being in contact with the first magnetic pole,
  a first magnetic pole length of the first magnetic pole along a second direction being shorter than a second magnetic pole length of the second magnetic pole along the second direction, the second direction being perpendicular to a first direction from the second magnetic layer to the first magnetic layer, and being along a medium-facing surface of the first magnetic pole, and
  a second magnetic layer length of the second magnetic layer along a third direction being longer than a first magnetic layer length of the first magnetic layer along the third direction, the third direction being perpendicular to the first direction.

Configuration 9
  The magnetic head according to any one of Configurations 7 to 9, wherein
  the first magnetic layer includes at least one of Fe, Co or Ni, and
  the second magnetic layer includes at least one of Fe, Co or Ni.

Configuration 10
  The magnetic head according to any one of Configurations 7 to 9, wherein
  the third direction crosses the second direction.

Configuration 11
  The magnetic head according to Configuration 10, wherein
  the first direction is inclined with respect to the medium-facing surface.

Configuration 12
  The magnetic head according to any one of Configurations 7 to 9, wherein
  the third direction is along the second direction.

Configuration 13
  The magnetic head according to any one of Configurations 1 to 12, wherein
  the composition ratio x is not less than 25 atomic % and not more than 35 atomic %.

Configuration 14
  The magnetic head according to Configuration 13, wherein
  the composition ratio x is not less than 10 atomic % and not more than 30 atomic %

Configuration 15
  The magnetic head according to any one of Configurations 1 to 14, wherein
  the first non-magnetic layer includes at least one first element selected from the group consisting of Ru, Ir, Ta and W, and
  a thickness of the first non-magnetic layer along the first direction is not less than 0.2 nm and not more than 3 nm.

Configuration 16
  The magnetic head according to any one of Configurations 1 to 15, wherein
  a first product of a first magnetic layer thickness of the first magnetic layer along the first direction and a saturation magnetization of the first magnetic layer is not less than 0.8 times and not more than 1.25 times a second product of a second magnetic layer thickness of the second magnetic layer along the first direction and a saturation magnetization of the second magnetic layer.

Configuration 17
  The magnetic head according to any one of Configurations 1 to 15, wherein
  a third magnetic layer thickness along the first direction of the third magnetic layer is not more than 0.7 times a first magnetic layer thickness of the first magnetic layer along the first direction, and not more than 0.7 times a second magnetic layer thickness of the second magnetic layer along the first direction.

Configuration 18

The magnetic head according to Configuration 17, wherein the second magnetic layer thickness is not less than 0.8 times and not more than 1.25 times the first magnetic layer thickness.

Configuration 19

The magnetic head according to any one of Configurations 1 to 17, wherein the second non-magnetic layer and the third non-magnetic layer include at least one selected from the group consisting of Cu, Au, Cr, Al, V and Ag.

Configuration 20

A magnetic recording device, comprising:

the magnetic head according to any one of Configurations 1 to 19; and an electric circuit, the electric circuit being configured to supply a current to the stacked body, and the current having an orientation from the first magnetic layer to the second magnetic layer.

According to the embodiment, a magnetic head and a magnetic recording device can be provided, in which a recording density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, wires, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic layer and the second magnetic pole,
a third magnetic layer provided between the second magnetic layer and the second magnetic pole,
a first non-magnetic layer provided between the first magnetic layer and the second magnetic layer,
a second non-magnetic layer provided between the second magnetic layer and the third magnetic layer,
a third non-magnetic layer provided between the first magnetic pole and the first magnetic layer, and
a fourth non-magnetic layer provided between the third magnetic layer and the second magnetic pole,
the fourth non-magnetic layer including at least one selected from the group consisting of Cu, Au, Al, V and Ag,
the third magnetic layer including $(F_{100-x}Co_x)_{100-y}E_y$ (TO atomic %≤x≤50 atomic %, 10 atomic %≤y≤90 atomic %), a second element E including at least one selected from the group consisting of Cr, V, Mn, Ti and Sc,
a first magnetic pole length of the first magnetic pole along a second direction being shorter than a second magnetic pole length of the second magnetic pole along the second direction, the second direction being perpendicular to a first direction from the first magnetic layer to the second magnetic layer, and being along a medium-facing surface of the first magnetic pole, and
a first magnetic layer length of the first magnetic layer along a third direction being longer than a second magnetic layer length of the second magnetic layer along the third direction, the third direction being perpendicular to the first direction.

2. The head according to claim 1, wherein
the third direction is along the second direction.

3. The head according to claim 1, wherein
the first magnetic layer includes at least one of Fe, Co or Ni, and
the second magnetic layer includes at least one of Fe, Co or Ni.

4. The head according to claim 1, wherein
the third direction crosses the second direction.

5. The head according to claim 4, wherein
the first direction is inclined with respect to the medium-facing surface.

6. The magnetic head according to claim 1, wherein
the composition ratio x is not less than 25 atomic % and not more than 35 atomic %.

7. The head according to claim 6, wherein
the composition ratio y is not less than 10 atomic % and not more than 30 atomic %.

8. The head according to claim 1, wherein
the first non-magnetic layer includes at least one first element selected from the group consisting of Ru, Ir, Ta and W, and
a thickness of the first non-magnetic layer along the first direction is not less than 0.2 nm and not more than 3 nm.

9. The head according to claim 1, wherein
a first product of a first magnetic layer thickness of the first magnetic layer along the first direction and a saturation magnetization of the first magnetic layer is not less than 0.8 times and not more than 1.25 times a second product of a second magnetic layer thickness of the second magnetic layer along the first direction and a saturation magnetization of the second magnetic layer.

10. The head according to claim 1, wherein
a third magnetic layer thickness along the first direction of the third magnetic layer is not more than 0.7 times a first magnetic layer thickness of the first magnetic layer along the first direction, and not more than 0.7 times a second magnetic layer thickness of the second magnetic layer along the first direction.

11. The head according to claim 10, wherein
the second magnetic layer thickness is not less than 0.8 times and not more than 1.25 times the first magnetic layer thickness.

12. The head according to claim 1, wherein
the second non-magnetic layer and the third non-magnetic layer include at least one selected from the group consisting of Cu, Au, Cr, Al, V and Ag.

13. A magnetic recording device, comprising:
the magnetic head according to claim 1; and
an electric circuit,
the electric circuit being configured to supply a current to the stacked body, and
the current having an orientation from the first magnetic layer to the second magnetic layer.

14. A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first non-magnetic layer provided between the second magnetic layer and the first magnetic layer,
a second non-magnetic layer provided between the third magnetic layer and the second magnetic layer,
a third non-magnetic layer provided between the first magnetic layer and the second magnetic pole, and
a fourth non-magnetic layer provided between the third magnetic layer and the first magnetic pole,
the fourth non-magnetic layer including at least one selected from the group consisting of Cu, Au, Al, V and Ag,
the third magnetic layer including $(Fe_{100-x}Co_x)_{100-y}E_y$ (10 atomic %$\leq$x$\leq$50 atomic %, 10 atomic %$\leq$y$\leq$90 atomic %), a second element E including at least one selected from the group consisting of Cr, V, Mn, Ti and Sc,
a first magnetic pole length of the first magnetic pole along a second direction being shorter than a second magnetic pole length of the second magnetic pole along the second direction, the second direction being perpendicular to a first direction from the second magnetic layer to the first magnetic layer, and being along a medium-facing surface of the first magnetic pole, and
a second magnetic layer length of the second magnetic layer along a third direction being longer than a first magnetic layer length of the first magnetic layer along the third direction, the third direction being perpendicular to the first direction.

15. The head according to claim 14, wherein
the third direction is along the second direction.

16. The head according to claim 14, wherein
the first magnetic layer includes at least one of Fe, Co or Ni, and
the second magnetic layer includes at least one of Fe, Co or Ni.

17. The head according to claim 14, wherein
the third direction crosses the second direction.

18. The head according to claim 17, wherein
the first direction is inclined with respect to the medium-facing surface.

* * * * *